United States Patent
Brown et al.

(10) Patent No.: US 10,435,629 B2
(45) Date of Patent: Oct. 8, 2019

(54) PRODUCTION OF CARBON BLACKS AND RESINS FROM HYDROTREATED CATALYTIC SLURRY OIL

(71) Applicant: ExxonMobil Research and Engineering Company, Annandale, NJ (US)

(72) Inventors: Stephen H. Brown, Lebanon, NJ (US); Brian A. Cunningham, Tokyo (JP); Randolph J. Smiley, Hellertown, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 108 days.

(21) Appl. No.: 15/790,201

(22) Filed: Oct. 23, 2017

(65) Prior Publication Data
US 2018/0134965 A1 May 17, 2018

Related U.S. Application Data

(60) Provisional application No. 62/422,089, filed on Nov. 15, 2016.

(51) Int. Cl.
| | |
|---|---|
| C09C 1/50 | (2006.01) |
| C10G 45/02 | (2006.01) |
| C10G 69/02 | (2006.01) |
| C10C 3/06 | (2006.01) |
| B01D 3/10 | (2006.01) |
| B01D 3/14 | (2006.01) |
| C09C 1/48 | (2006.01) |
| C10G 67/14 | (2006.01) |
| D01F 9/155 | (2006.01) |
| C10G 49/00 | (2006.01) |
| C10G 69/04 | (2006.01) |
| C10G 69/06 | (2006.01) |
| C10G 11/18 | (2006.01) |

(52) U.S. Cl.
CPC .............. *C10C 3/06* (2013.01); *B01D 3/10* (2013.01); *B01D 3/14* (2013.01); *C09C 1/487* (2013.01); *C10G 11/18* (2013.01); *C10G 49/002* (2013.01); *C10G 67/14* (2013.01); *C10G 69/04* (2013.01); *C10G 69/06* (2013.01); *D01F 9/155* (2013.01); *C10G 2400/16* (2013.01); *C10G 2400/30* (2013.01)

(58) Field of Classification Search
CPC ........... C09C 1/487; C09C 1/50; C10G 45/02; C10G 69/02
See application file for complete search history.

(56) References Cited

U.S. PATENT DOCUMENTS

| | | | |
|---|---|---|---|
| 2,895,895 A * | 7/1959 | De Ridder | ................ C09C 1/54 208/100 |
| 4,075,084 A | 2/1978 | Skripek et al. | |
| 5,158,668 A * | 10/1992 | Chahar | ................ C10B 55/00 208/131 |
| 5,871,634 A | 2/1999 | Wiehe et al. | |
| 2011/0062054 A1 | 3/2011 | Gao et al. | |
| 2014/0275676 A1 | 9/2014 | Sieli et al. | |
| 2015/0147264 A1 * | 5/2015 | Chatron-Michaud | ....................... C01B 32/05 423/450 |
| 2017/0002279 A1 | 1/2017 | Brown et al. | |

FOREIGN PATENT DOCUMENTS

| | | |
|---|---|---|
| FR | 3013717 A1 | 5/2015 |
| WO | 2013033288 A2 | 3/2013 |

OTHER PUBLICATIONS

International Search Report and Written Opinion PCT/US2017/057837 dated Apr. 3, 2018.

* cited by examiner

*Primary Examiner* — Randy Boyer
(74) *Attorney, Agent, or Firm* — Andrew T. Ward; Priya G. Prasad

(57) ABSTRACT

Systems and methods are provided for forming specialty products from hydrotreated FCC fractions. Optionally, the hydrotreated FCC fractions used for forming the specialty products can further include a (hydrotreated) portion of a steam cracker tar fraction. The specialty products that can be formed from hydrotreated FCC fractions include, but are not limited to, carbon blacks, resins, and carbon fibers. A convenient method for forming the hydrotreated FCC fractions can be fixed bed hydrotreatment.

10 Claims, 7 Drawing Sheets

| | CSO Feed | 80% CSO + 20% SCT | HT CSO | HT 80% CSO + 20% SCT |
|---|---|---|---|---|
| Days on Oil | | | 38 | 55 |
| Liq / Liq MB closure | | | 98% | 99.2% |
| Sulfur wppm | 3.1 (wt%) | 3.1 (wt%) | 641 | 1800 |
| Nitrogen wppm | 2100 | 1590 | 162 | 277 |
| API gravity | -4.7 | -4.4 | 10.08 | 9.32 |
| Kerosene yield wt% | 1 | 5 | 3 | 7 |
| Diesel yield wt% | 9 | 14 | 35 | 35 |
| VGO yield wt% | 81 | 72 | 57 | 51 |
| 538°C+ wt% | 9 | 9 | 5 | 6 |

FIG. 7

PRODUCTION OF CARBON BLACKS AND RESINS FROM HYDROTREATED CATALYTIC SLURRY OIL

CROSS-REFERENCE TO RELATED APPLICATIONS

This application claims the benefit of U.S. Provisional Application No. 62/422,089, filed on Nov. 15, 2016, the entire contents of which are incorporated herein by reference.

FIELD

Systems and methods are provided for production of specialty products from feeds derived from catalytic and/or thermal cracking processes.

BACKGROUND

Fluid catalytic cracking (FCC) processes are commonly used in refineries as a method for converting feedstocks, without requiring additional hydrogen, to produce lower boiling fractions suitable for use as fuels. While FCC processes can be effective for converting a majority of a typical input feed, under conventional operating conditions at least a portion of the resulting products can correspond to a fraction that exits the process as a "bottoms" fraction. This bottoms fraction can typically be a high boiling range fraction, such as a ~650° F.+ (~343° C.+) fraction. Because this bottoms fraction may also contain FCC catalyst fines, this fraction can sometimes be referred to as a catalytic slurry oil.

Steam cracking, also referred to as pyrolysis, has long been used to crack various hydrocarbon feedstocks into olefins, preferably light olefins such as ethylene, propylene, and butenes. Conventional steam cracking utilizes a pyrolysis furnace wherein the feedstock, typically comprising crude or a fraction thereof optionally desalted, is heated sufficiently to cause thermal decomposition of the larger molecules. Among the valuable and desirable products include light olefins such as ethylene, propylene, and butylenes. The pyrolysis process, however, also produces molecules that tend to combine to form high molecular weight materials known as steam cracked tar or steam cracker tar, hereinafter referred to as "SCT". These are among the least valuable products obtained from the effluent of a pyrolysis furnace. In general, feedstocks containing higher boiling materials ("heavy feeds") tend to produce greater quantities of SCT. It should be noted that the terms thermal pyrolysis unit, pyrolysis unit, and steam cracker are used synonymously herein; all refer to what is conventionally known as a steam cracker, even though steam is optional.

Steam cracking processes are commonly used in refineries as a method for producing olefins from heavy oils or other low value fractions. A side product generated during steam cracking can be steam cracker tar. Steam cracker tar can typically be a highly aromatic product with a boiling range similar to a vacuum gas oil and/or a vacuum resid fraction. Conventionally, steam cracker tar can be difficult to process using a fixed bed reactor because various molecules within a steam cracker tar feed are highly reactive, leading to fouling and operability issues. Such processing difficulties can be further complicated, for example, by the high viscosity of the feed, the presence of coke fines within a steam cracker tar feed, and/or other properties related to the composition of steam cracker tar.

U.S. Publication 2017/0002279 describes methods for fixed bed hydroprocessing of catalytic slurry oil under various conditions.

SUMMARY

In an aspect, a method for forming a hydrocarbon product is provided. The method can include exposing a feed comprising at least about 60 wt % of a catalytic slurry oil based on a weight of the feed (or at least about 70 wt %) to a hydrotreating catalyst in a fixed bed under effective hydrotreating conditions to form a hydrotreated effluent. A liquid portion of the hydrotreated effluent can have a sulfur content of about 200 wppm or less and an API gravity of at least 5. The liquid portion of the hydrotreated effluent can be fractionated to form a plurality of fractions having a T5 boiling point of at least 371° C. At least one fraction of the plurality of fractions can then be processed under a) conditions for formation of carbon black (for example, conditions comprising a furnace black process) b) second hydroprocessing conditions for forming at least one twice-hydroprocessed fraction comprising at least about 50 wt % polycyclic hydrocarbons and having a content of aromatics different from naphthenoaromatics of about 1.0 wt % or less; or c) conditions for formation of carbon fiber.

Optionally, the at least one fraction can have a combined sulfur and nitrogen content of about 200 wppm or less, or about 100 wppm or less. Optionally, the at least one fraction can have a T5 boiling point of at least 454° C., a T10 boiling point of at least 510° C., or a combination thereof. Optionally, the at least one fraction can correspond to one or more fractions having a T5 to T95 boiling range of about 20° C. to about 40° C. Optionally, the method can further comprise separating the feed to form an effluent having a reduced particle content, the exposing the feed to a hydrotreating catalyst comprising exposing the effluent having a reduced particle content to the hydrotreating catalyst.

In some aspects, such as an aspect for formation of carbon black, processing the at least one fraction can correspond to processing two or more fractions, the two or more fractions being combined to form a combined fraction having at least one of a bimodal distillation profile and a multimodal distillation profile. In such an aspect, processing under conditions for forming carbon black can produce carbon black particles having at least one of a bimodal particle size distribution and a multimodal particle size distribution.

In some aspects, processing the at least one fraction under second hydroprocessing conditions can correspond to exposing the at least one fraction to a hydrotreating catalyst, an aromatic saturation catalyst, or a combination thereof.

Optionally, the feed can further include about 5 wt % to about 30 wt % of steam cracker tar. In such an optional aspect, the feed can further optionally include about 1 wt % to about 30 wt % of flux. Optionally, the hydrotreated effluent can be formed by a process comprising hydrotreatment of a feed comprising at least 60 wt % of a catalytic slurry oil based on the weight of the feed, at least 10 wt % of a steam cracker tar based on the weight of the feed, or a combination thereof. Optionally, the plurality of fractions can comprise at least about 60 wt % polycyclic hydrocarbons based on a weight of the plurality of fractions, or at least about 70 wt %.

In another aspect, a hydrotreated effluent comprising an 850° F.+ (454° C.+) fraction is provided. The 850° F.+ (454° C.+) fraction of the hydrotreated effluent can comprise at least about 50 wt % of polycyclic hydrocarbonaceous compounds based on a weight of the 850° F.+ (454° C.+)

fraction, at least about 50 wt % of the polycyclic hydrocarbonaceous compounds being naphthenes based on a total weight of polycyclic hydrocarbonaceous compounds in the 850° F.+ (454° C.+) fraction. The 850° F.+ (454° C.+) fraction can further include at least about 5 wt % aromatics. Optionally, a content of aromatics different from naphthenoaromatics can being about 1.0 wt % or less (or about 1000 wppm or less). Optionally, a content of naphthenoaromatics having 4 or more aromatic rings can be about 1000 wppm or less. Optionally, the 850° F.+ (454° C.+) fraction can comprise at least about 60 wt % of polycyclic hydrocarbonaceous compounds, or at least about 70 wt %; or the 850° F.+ (454° C.+) fraction can comprises at least about 50 wt % of polycyclic hydrocarbons, or at least about 60 wt %, or at least about 70 wt %.

In still another aspect, a hydrotreated effluent fraction having a T10 boiling point of at least 510° C., optionally a T50 boiling point of at least 566° C., and a T90 boiling point of 621° C. or less can be provided. The hydrotreated effluent fraction can comprise at least about 50 wt % of polycyclic hydrocarbonaceous compounds (or at least about 60 wt %, or at least about 70 wt %) and at least about 0.1 wt % to about 5.0 wt % aromatics based on a weight of the hydrotreated effluent fraction. Optionally, a content of aromatics different from naphthenoaromatics can be about 1.0 wt % or less (or about 1000 wppm or less). Optionally, a content of naphthenoaromatics having 4 or more aromatic rings can be about 1000 wppm or less. Optionally, the hydrotreated effluent fraction can comprise about 10 wt % of paraffins or less, or about 5.0 wt % or less, or about 2.0 wt % or less. Optionally, the hydrotreated effluent can be formed by a process comprising hydrotreatment of a feed comprising at least 60 wt % of a catalytic slurry oil based on a weight of the feed, at least 10 wt % of a steam cracker tar based on a weight of the feed, or a combination thereof.

BRIEF DESCRIPTION OF THE FIGURES

FIG. 7 shows results from hydrotreatment of a catalytic slurry oil relative to results for hydrotreatment of a blended feed.

DETAILED DESCRIPTION

Figure 1:
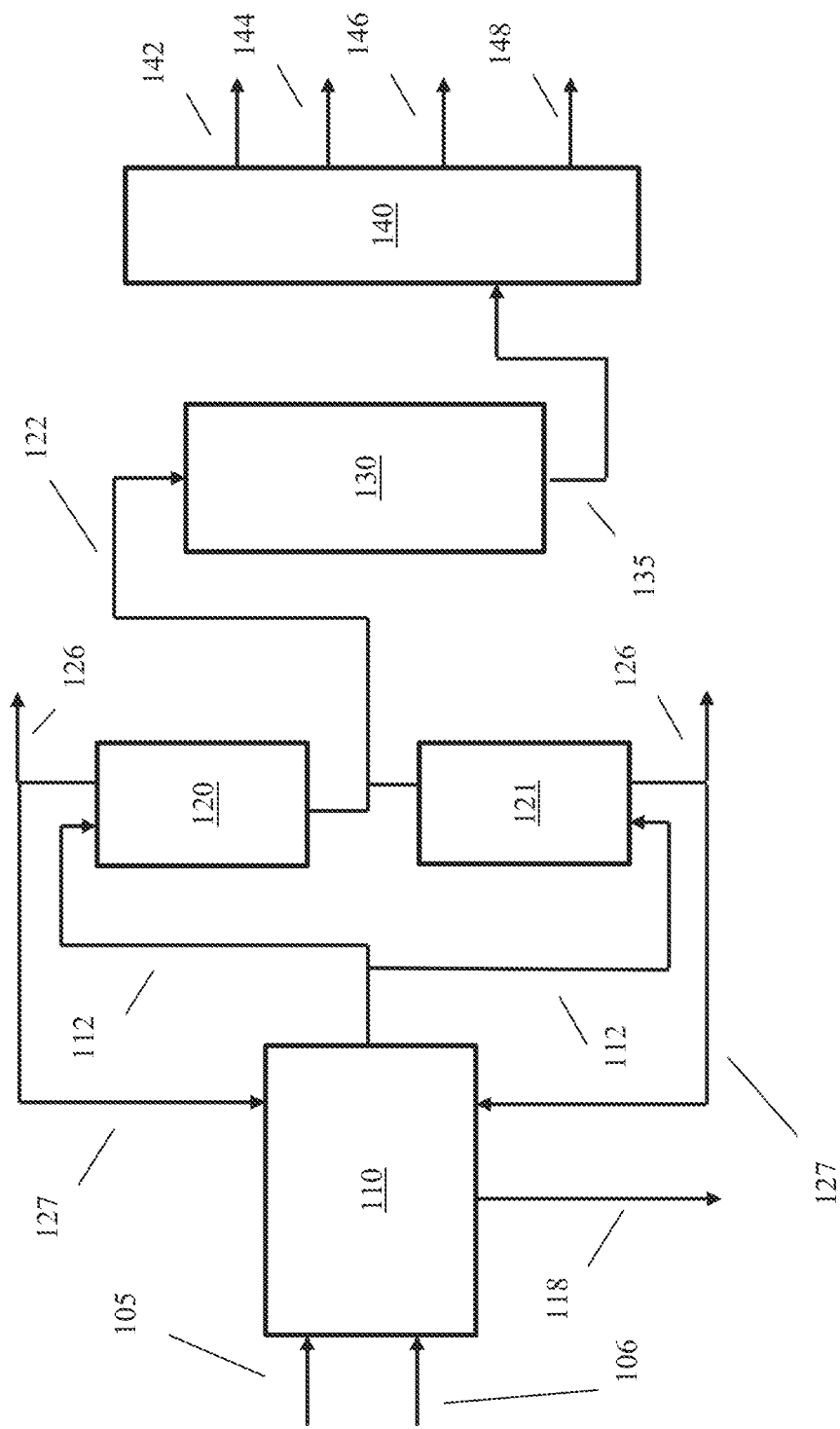
FIG. 1 shows an example of a reaction system for processing a feed including catalytic slurry oil and optionally steam cracker tar.

In various aspects, systems and methods are provided for forming specialty products from hydrotreated FCC fractions, and in particular from hydrotreated FCC bottoms or catalytic slurry oil fractions. Optionally, the hydrotreated FCC fractions used for forming the specialty products can further include a (hydrotreated) portion of a steam cracker tar fraction. The specialty products that can be formed from hydrotreated FCC fractions include, but are not limited to, carbon blacks, resins, and carbon fibers. Optionally, the fractions for forming specialty products corresponding to resins and/or adhesives can correspond to fractions that have been twice-hydroprocessed. A convenient method for forming the hydrotreated FCC fractions can be fixed bed hydrotreatment.

Conventional methods for forming carbon black can use catalytic slurry oil, coal tar, and steam cracker tar as potential feeds into a carbon black formation process. However, it can be difficult with conventional methods to control feed properties in a desired manner to allow for control of properties of the resulting carbon black. This is due in part to the challenge of performing distillation on a catalytic slurry oil, coal tar, or steam cracker tar type feed. In particular, feeds that include at least about 50 wt % aromatics (or at least about 60 wt %) and/or that include substantial amounts of polynuclear aromatics (PNAs) can be difficult to distill effectively, due to a tendency for the boiling range of aromatics/PNAs to increase as the concentration of aromatics/PNAs increases in a mixture. Additionally, feeds containing catalytic slurry oil and/or steam cracker tar can typically include high boiling, high viscosity components, which can cause the vacuum tower bottoms from a distillation to have undesirable properties.

Instead of using catalytic slurry oil or steam cracker tar as a feed for formation of specialty products, a hydrotreated effluent can be formed by hydrotreating a catalytic slurry oil or a blend of catalytic slurry oil and steam cracker tar. Optionally, the steam cracker tar in such a blend can correspond to a "fluxed" steam cracker tar that includes a flux portion to improve the flow properties of the steam cracker tar feed. After hydrotreatment, the total aromatic content and/or the number of PNAs can be reduced, and the quality of any vacuum tower bottoms formed during fractionation can be enhanced. This can allow for fractionation of the hydrotreated effluent into narrow cuts. The ability to form narrow boiling range fractions or cuts can allow for improved control over the resulting product properties of a carbon black or other specialty product. For example, use of narrow boiling range fractions as a feed to a process for forming carbon black can allow for improved control over particle size distribution, surface area, and/or product morphology. Conventionally, substantial hydrotreating of catalytic slurry oil and/or steam cracker tar is not performed due to difficulties in processing such feeds. This can include the conventional belief that attempting to hydrotreat such feeds in fixed bed reactors will quickly lead to plugging. However, it has been discovered that catalytic slurry oil can be effectively processed using fixed bed hydrotreating by avoiding mixing of the catalytic slurry oil with conventional feeds having lower solubility numbers.

As defined herein, the term "hydrocarbonaceous" includes compositions or fractions that contain hydrocarbons and hydrocarbon-like compounds that may contain heteroatoms typically found in petroleum or renewable oil fraction and/or that may be typically introduced during conventional processing of a petroleum fraction. Heteroatoms typically found in petroleum or renewable oil fractions include, but are not limited to, sulfur, nitrogen, phosphorous, and oxygen. Other types of atoms different from carbon and hydrogen that may be present in a hydrocarbonaceous fraction or composition can include alkali metals as well as trace transition metals (such as Ni, V, or Fe).

In this discussion, reference may be made to catalytic slurry oil, FCC bottoms, and main column bottoms. These terms can be used interchangeably herein. It can be noted that when initially formed, a catalytic slurry oil can include several weight percent of catalyst fines. Such catalyst fines can optionally be removed (such as partially removed to a desired level) by any convenient method, such as filtration. Any such catalyst fines can be removed prior to incorporating a fraction derived from a catalytic slurry oil into a product pool, such as a naphtha fuel pool or a diesel fuel pool. In this discussion, unless otherwise explicitly noted, references to a catalytic slurry oil are defined to include catalytic slurry oil either prior to or after such a process for reducing the content of catalyst fines within the catalytic slurry oil. Similarly, unless otherwise explicitly noted, references to a steam cracker tar are defined to include steam cracker tar either prior to or after a process for reducing the content of particles within the steam cracker tar.

In some aspects, reference may be made to conversion of a feedstock relative to a conversion temperature. Conversion relative to a temperature can be defined based on the portion of the feedstock that boils at greater than the conversion temperature. The amount of conversion during a process (or optionally across multiple processes) can correspond to the weight percentage of the feedstock converted from boiling above the conversion temperature to boiling below the conversion temperature. As an illustrative hypothetical example, consider a feedstock that includes 40 wt % of components that boil at 700° F. (~371° C.) or greater. By definition, the remaining 60 wt % of the feedstock boils at less than 700° F. (~371° C.). For such a feedstock, the amount of conversion relative to a conversion temperature of ~371° C. would be based only on the 40 wt % that initially boils at ~371° C. or greater.

In various aspects, reference may be made to one or more types of fractions generated during distillation of a petroleum feedstock. Such fractions may include naphtha fractions, kerosene fractions, diesel fractions, and vacuum gas oil fractions. Each of these types of fractions can be defined based on a boiling range, such as a boiling range that includes at least ~90 wt % of the fraction, or at least ~95 wt % of the fraction. For example, for many types of naphtha fractions, at least ~90 wt % of the fraction, or at least ~95 wt %, can have a boiling point in the range of ~85° F. (~29° C.) to ~350° F. (~177° C.). For some heavier naphtha fractions, at least ~90 wt % of the fraction, and preferably at least ~95 wt %, can have a boiling point in the range of ~85° F. (~29° C.) to ~400° F. (~204° C.). For a kerosene fraction, at least ~90 wt % of the fraction, or at least ~95 wt %, can have a boiling point in the range of ~300° F. (~149° C.) to ~600° F. (~288° C.). For a kerosene fraction targeted for some uses, such as jet fuel production, at least ~90 wt % of the fraction, or at least ~95 wt %, can have a boiling point in the range of ~300° F. (~149° C.) to ~550° F. (~288° C.). For a diesel fraction, at least ~90 wt % of the fraction, and preferably at least ~95 wt %, can have a boiling point in the range of ~400° F. (~204° C.) to ~750° F. (~399° C.). For a (vacuum) gas oil fraction, at least ~90 wt % of the fraction, and preferably at least ~95 wt %, can have a boiling point in the range of ~650° F. (~343° C.) to ~1100° F. (~593° C.). Optionally, for some gas oil fractions, a narrower boiling range may be desirable. For such gas oil fractions, at least ~90 wt % of the fraction, or at least ~95 wt %, can have a boiling point in the range of ~650° F. (~343° C.) to 1000° F. (~538° C.), or ~650° F. (~343° C.) to ~900° F. (~482° C.). A residual fuel product can have a boiling range that may vary and/or overlap with one or more of the above boiling ranges. A residual marine fuel product can satisfy the requirements specified in ISO 8217, Table 2.

A method of characterizing the solubility properties of a petroleum fraction can correspond to the toluene equivalence (TE) of a fraction, based on the toluene equivalence test as described for example in U.S. Pat. No. 5,871,634 (incorporated herein by reference with regard to the definition for toluene equivalence, solubility number ($S_{BN}$), and insolubility number ($I_N$)). The calculated carbon aromaticity index (CCAI) can be determined according to ISO 8217. BMCI can refer to the Bureau of Mines Correlation Index, as commonly used by those of skill in the art.

In this discussion and the claims below, the effluent from a processing stage may be characterized in part by characterizing a fraction of the products. For example, the effluent from a processing stage may be characterized in part based on a portion of the effluent that can be converted into a liquid product. This can correspond to a $C_3+$ portion of an effluent, and may also be referred to as a total liquid product. As another example, the effluent from a processing stage may be characterized in part based on another portion of the effluent, such as a $C_5+$ portion or a $C_6+$ portion. In this discussion, a portion corresponding to a "$C_x+$" portion can be, as understood by those of skill in the art, a portion with an initial boiling point that roughly corresponds to the boiling point for an aliphatic hydrocarbon containing "x" carbons.

In this discussion and the claims below, references to a wt % or a vol % refer to the weight of the feed or fraction being described, unless otherwise specified.

Feedstock

In various aspects, a feedstock corresponding to a catalytic slurry oil fraction and/or a feedstock that includes a blend of both a portion of catalytic slurry oil and a portion of steam cracker tar can be hydroprocessed, such as by hydrotreating in a fixed bed reactor, to form a hydrotreated feed for production of specialty products. Prior to hydrotreatment, the feedstock can optionally be exposed to a particle removal stage to reduce the content of catalyst fines, coke fines, and/or other particles from the feed. The feedstock, after any optional treatment in a particle removal stage, can have a particle content of about 500 wppm or less, or about 100 wppm or less, or about 50 wppm or less, or about 20 wppm or less, such as down to substantially no content of suspended solids (~0 wppm).

Fluid catalytic cracking (FCC) processes can commonly be used in refineries to increase the amount of fuels that can be generated from a feedstock. Because FCC processes do not typically involve addition of hydrogen to the reaction environment, FCC processes can be useful for conversion of higher boiling fractions to naphtha and/or distillate boiling range products at a lower cost than hydroprocessing. However, such higher boiling fractions can often contain multi-ring aromatic compounds that are not readily converted, in the absence of additional hydrogen, by the medium pore or large pore molecular sieves typically used in FCC processes. As a result, FCC processes can often generate a bottoms fraction that can be highly aromatic in nature. The bottoms fraction may also contain catalyst fines generated from the fluidized bed of catalyst during the FCC process. This type of FCC bottoms fraction may be referred to as a catalytic slurry oil or main column bottoms.

Typically the cut point for forming a catalytic slurry oil can be at least about 650° F. (~343° C.). As a result, a catalytic slurry oil can have a T5 distillation (boiling) point or a T10 distillation point of at least about 650° F. (~343° C.), as measured according to ASTM D2887. In some aspects the D2887 10% distillation point can be greater, such as at least about 675° F. (~357° C.), or at least about 700° F. (~371° C.). In some aspects, a broader boiling range portion of FCC products can be used as a feed (e.g., a 350° F.+/~177° C.+ boiling range fraction of FCC liquid product), where the broader boiling range portion includes a 650° F.+ (~343° C.+) fraction that corresponds to a catalytic slurry oil. The catalytic slurry oil (650° F.+/−343° C.+) fraction of the feed does not necessarily have to represent a "bottoms" fraction from an FCC process, so long as the catalytic slurry oil portion comprises one or more of the other feed characteristics described herein.

In addition to and/or as an alternative to initial boiling points, T5 distillation point, and/or T10 distillation points, other distillation points may be useful in characterizing a feedstock. For example, a feedstock can be characterized based on the portion of the feedstock that boils above 1050° F. (~566° C.). In some aspects, a feedstock (or alternatively a 650° F.+/−343° C.+ portion of a feedstock) can have an ASTM D2887 T95 distillation point of 1050° F. (~566° C.) or greater, or a T90 distillation point of 1050° F. (~566° C.) or greater. In the claims below, references to boiling points, distillation points, and/or fractional weight boiling points/ distillation points are with reference to ASTM D2887. If a feedstock or other sample contains components that are not suitable for characterization using D2887, ASTM D7169 may be used instead.

"Tar" or steam cracker tar (SCT) as used herein is also referred to in the art as "pyrolysis fuel oil". The terms can be used interchangeably herein. The tar will typically be obtained from the first fractionator downstream from a steam cracker (pyrolysis furnace) as the bottoms product of the fractionator, nominally having a boiling point of at least about 550° F.+ (~288° C.+). Boiling points and/or fractional weight distillation points can be determined by, for example, ASTM D2892. Alternatively, SCT can have a T5 boiling point (temperature at which 5 wt % will boil off) of at least about 550° F. (~288° C.). The final boiling point of SCT can be dependent on the nature of the initial pyrolysis feed and/or the pyrolysis conditions, and typically can be about 1450° F. (~788° C.) or less.

As an example, SCT can be obtained as a product of a pyrolysis furnace wherein additional products include a vapor phase including ethylene, propylene, butenes, and a liquid phase comprising $C_{5+}$ species, having a liquid product distilled in a primary fractionation step to yield an overheads comprising steam-cracked naphtha fraction (e.g., $C_5$-$C_{10}$ species) and steam cracked gas oil (SCGO) fraction (i.e., a boiling range of about 400 to 550° F., or ~204 to ~288° C., e.g., $C_{10}$-$C_{15}$/$C_{17}$ species), and a bottoms fraction comprising SCT and having a boiling range above about 550° F. (~288° C.), e.g., $C_{15}$/$C_{17+}$ species.

Optionally, the feed can also include a flux for the steam cracker tar, such as a flux to improve the flow properties of the steam cracker tar. Examples of suitable flux for a steam cracker tar fraction can include, but are not limited to, steam cracker gas oil and other types of atmospheric or vacuum gas oil boiling range fractions. Thus, a flux can correspond to a fraction with a T5 boiling point of at least 343° C. and/or a T95 boiling point of 593° C. or less. Preferred fluxes are highly aromatic, e.g. steam cracker gasoil, LCCO, heavy FCC naphtha, and heavy reformate. Similar to MCB and steam cracker tar feedstocks, aromatic fluxes can have high $S_{BN}$.

Conventional fixed bed processing of SCT is generally not practical for various reasons. As a standalone feed, SCT can quickly foul fixed bed processing units. Without being bound by any particular theory, this is believed to be due in part to asphaltenes within the SCT becoming insoluble during hydroprocessing, resulting in asphaltene precipitation within the fixed catalyst bed. In particular, SCT can have relatively high values for both $S_{BN}$ and $I_N$. Because $S_{BN}$ can drop substantially more rapidly than $I_N$ during hydroprocessing that results in conversion of a feed (such as conversion relative to 700° F./~371° C. or conversion relative to 1050° F./~566° C.), attempts to hydroprocess SCT in a meaningful manner can quickly result in fouling and/or plugging of fixed bed reactors. Attempting to co-process SCT with other feeds can potentially exacerbate this difficulty, as most conventional refinery feeds can have starting $S_{BN}$ values that are substantially less than SCT. Additionally, portions of an SCT feed can have a viscosity and/or other flow properties that can result in portions of an SCT feed adhering to surfaces within processing equipment, leading to further fouling. Still an additional problem can be the tendency for SCT to generate additional coke fines, solid asphaltenes, or other particles. When an SCT is filtered to remove particles, equilibrium processes can cause additional particles to form within the SCT. These particles can contribute to plugging of fixed bed catalyst beds. Due to one or more of these difficulties, fixed bed processing of SCT can typically be avoided in a refinery setting. Instead, SCT is often used as a component of a fuel oil pool, which corresponds to a relatively low value use.

In some aspects, a catalytic slurry oil can be hydrotreated to produce a hydrotreated fraction suitable for production of specialty products. In other aspects, a blend including steam cracker tar and catalytic slurry oil can be hydrotreated to produce a hydrotreated fraction. In this discussion, references to a steam cracker tar or a steam cracker tar portion are considered interchangeable unless otherwise specified. It is noted a steam cracker tar or steam cracker tar portion is defined to include steam cracker tars and/or steam cracker tar portions that have passed through a separation stage to reduce the particle content. Similarly, references to a catalytic slurry oil or catalytic slurry oil portion are considered interchangeable unless otherwise specified, and are defined to include catalytic slurry oils and/or catalytic slurry oil portions that have passed through a separation stage to reduce the particle content. In aspects where a feed includes a blend of both a catalytic slurry oil and a steam cracker tar, the blended feed can include at least about 0.1 wt % steam cracker tar, or at least about 1.0 wt %, or at least about 5.0 wt %, or at least about 10 wt %. Additionally or alternately, the blended feed can include about 30 wt % or less of steam cracker tar, or about 25 wt % or less, or about 20 wt % or less, or about 15 wt % or less, or about 10 wt % or less. In particular, a feed can include about 0.1 wt % to about 25 wt % of steam cracker tar, or about 0.1 wt % to about 30 wt %, or about 1.0 wt % to about 20 wt %. In some aspects, the blended feed can further include 1.0 wt % to 30 wt % of a "flux" (or 1.0 wt % to 20 wt %, or 1.0 wt % to 10 wt %), either in the form of a separately added flux or in the form of a fluxed steam cracker tar. For example, the blended feed can optionally include at least about 1.0 wt % flux, or at least about 5.0 wt %, or at least about 10 wt %, and/or about 30 wt % or less, or about 25 wt % or less, or about 20 wt % or less, or about 10 wt % or less. The blended feed can further include at least about 50 wt % catalyst slurry oil, or at least about 60 wt %, or at least about 70 wt %, or at least about 80 wt %, or at least about 90 wt %. Additionally or alternately, the feed can contain about 99 wt % or less of catalytic slurry oil, or about 95 wt % or less, or about 90 wt % or less. In particular, a feed can include about 50 wt % to about 99 wt % catalytic slurry oil, or about 50 wt % to about 90 wt %, or about 70 wt % to about 99 wt %. Optionally, the feed can be substantially composed of catalytic slurry oil and steam cracker tar, with less than about 10 wt % of other feed components, or less than about 5.0 wt %, or less than about 1.0 wt %, or less than about 0.1 wt %. In particular, the feed can optionally include about 0 wt % to about 10 wt % of other components, or about 0 wt % to about 5.0 wt %, or about 0.1 wt % to about 5.0 wt %, or about 0.1 wt % to about 1.0 wt %. In contrast to many types of potential feeds for production of fuels, the asphaltenes in a blend of catalytic slurry oil and steam cracker tar can apparently be converted on a time scale comparable to the time scale for conversion of other aromatic compounds in the catalytic slurry oil. This can have the effect that during hydroprocessing, the rate of decrease of the $S_{BN}$ for a blend of catalytic slurry oil and steam cracker tar can be similar to the rate of decrease of $I_N$, so that precipitation of asphaltenes during processing can be reduced, minimized, or eliminated. As a result, it has been unexpectedly discovered that blends of catalytic slurry oil and steam cracker tar can be processed at effective hydroprocessing conditions for substantial conversion of the feed without causing excessive coking of the catalyst.

Prior to hydrotreatment, a feed including a catalytic slurry oil (optionally further including a steam cracker tar portion) can have a relatively low hydrogen content compared to heavy oil fractions that are typically processed in a refinery setting. In some aspects, a feed can have a hydrogen content of about 8.5 wt % or less, or about 8.0 wt % or less, or about 7.5 wt % or less, or about 7.0 wt % or less, or about 6.5 wt % or less. In particular, a feed can have a hydrogen content of about 5.5 wt % to about 8.5 wt %, or about 6.0 wt % to about 8.0 wt %, or about 5.5 wt % to about 7.5 wt %. Additionally or alternately, a feed can have a micro carbon residue (or alternatively Conradson Carbon Residue) of at least about 5 wt %, or at least about 10 wt %, or at least about 15 wt %, such as up to about 20 wt % or more. In the claims below, ASTM D4530 can be used to determine carbon residue.

A feed including catalytic slurry oil and/or SCT can also be highly aromatic in nature. In some aspects, the paraffin content of a feed can be about 2.0 wt % or less, or about 1.0 wt % or less, such as having substantially no paraffin content. In some aspects, the naphthene content of a feed can also be about 10 wt % or less or about 5.0 wt % or less. In still other aspects, the combined paraffin and naphthene content of a feed can be about 10 wt % or less. With regard to aromatics, at least about 65 wt % of the feed can be aromatics, as determined by $^{13}$C-NMR, or at least about 75 wt %. For example, the aromatics can be about 65 wt % to about 90 wt %, or about 65 wt % to 85 wt %, or about 70 wt % to about 90 wt %. In particular, the greater-than-3-ring aromatics content (i.e., 4+ ring aromatics) can be about 45 wt % to about 90 wt %, or about 50 wt % to about 75 wt %, or about 50 wt % to about 70 wt %. Additionally or alternately, at least about 30 wt % of a blended feed can correspond to greater-than-4-ring aromatics (i.e., 5+ ring aromatics), or at least 40 wt %. In particular, the greater-than-4-ring aromatics content can be about 30 wt % to about 60 wt %, or about 40 wt % to about 55 wt %, or about 40 wt % to about 50 wt %. Additionally or alternately, the 1-ring aromatic content can be about 15 wt % or less, or about 10 wt % or less, or about 5 wt % or less, such as down to about 0.1 wt %.

Based on the content of NHI and/or MCR in a catalytic slurry oil feed, the insolubility number ($I_N$) for such a feed can be at least about 60, such as at least about 70, at least about 80, or at least about 90. Additionally or alternately, the IN for such a feed can be about 140 or less, such as about 130 or less, about 120 or less, about 110 or less, about 100 or less, about 90 or less, or about 80 or less. Each lower bound noted above for IN can be explicitly contemplated in conjunction with each upper bound noted above for IN. In particular, the IN for a catalytic slurry oil feed can be about 60 to about 140, or about 60 to about 120, or about 80 to about 140.

Due to the low hydrogen content and/or highly aromatic nature of SCT, the solubility number ($S_{BN}$) and insolubility number ($I_N$) of SCT can be relatively high. SCT can have a $S_{BN}$ of at least about 100, and in particular about 120 to about 230, or about 150 to about 230, or about 180 to about 220. Additionally or alternately, SCT can have an $I_N$ of about 70 to about 150, or about 100 to about 140, or about 80 to about 140. Further additionally or alternately, the difference between $S_{BN}$ and $I_N$ for the SCT can be at least about 30, or at least about 40, or at least about 50, such as up to about 100. Without being bound by any particular theory, it is believed that the high $S_{BN}$ of catalytic slurry oil can allow SCT to be blended with catalytic slurry oil to make a suitable feed for fixed bed hydroprocessing.

A blended feed of catalytic slurry oil and SCT can also have a higher density than many types of crude or refinery fractions. In various aspects, a blended feed can have a density at 15° C. of about 1.08 g/cm$^3$ to about 1.20 g/cm$^3$, or 1.10 g/cm$^3$ to 1.18 g/cm$^3$. By contrast, many types of vacuum resid fractions can have a density of about 1.05 g/cm$^3$ or less. Additionally or alternately, density (or weight per volume) of the heavy hydrocarbon can be determined according to ASTM D287-92 (2006) Standard Test Method for API Gravity of Crude Petroleum and Petroleum Products (Hydrometer Method), which characterizes density in terms of API gravity. In general, the higher the API gravity, the less dense the oil. The units for API gravity are degrees, although API values can often be reported without the associated unit. In various aspects, the API gravity of a blended feed (including any optional flux) can be 7 or less, or 5 or less, or 0 or less, such as down to about −15 or lower.

Contaminants such as nitrogen and sulfur are typically found in both catalytic slurry oil and SCT, often in organically-bound form. Nitrogen content can range from about 50 wppm to about 10,000 wppm elemental nitrogen or more, based on total weight of a blended feed. Sulfur content can range from about 0.1 wt % to about 10 wt %, based on total weight of a blended feed. In particular, the sulfur content can be about 0.1 wt % to about 10 wt %, or 1.0 wt % to about 10 wt %, or about 2.0 wt % to about 6.0 wt %.

The term "asphaltene" is well-known in the art and generally refers to the material obtainable from crude oil and having an initial boiling point above 1200° F. (i.e., 1200° F.+ or ~650° C.+ material) and which is insoluble in straight chain alkanes such as hexane and heptanes, i.e., paraffinic solvents. Asphaltenes are high molecular weight, complex aromatic ring structures and may exist as colloidal dispersions. They are soluble in aromatic solvents like xylene and toluene. Asphaltene content can be measured by various techniques known to those of skill in the art, e.g., ASTM D3279. In various aspects, a catalytic slurry oil feed (optionally including a portion of steam cracker tar) can include, prior to hydrotreatment, can contain at least about 1.0 wt % of n-heptane insolubles or asphaltenes, or at least about 2.0 wt %, or at least about 3.0 wt %, or at least about 5.0 wt %, or at least about 8.0 wt %, such as up to about 15 wt % or more. In particular, the feed (or alternatively a ~343° C.+ portion of a feed) can contain about 1.0 wt % to about 15 wt % of n-heptane insolubles or asphaltenes, or about 2.0 wt % to about 15 wt %, or about 3.0 wt % to about 15 wt %. Another option for characterizing the heavy components of a catalytic slurry oil can be based on the amount of micro carbon residue (MCR) in the feed. In various aspects, the amount of MCR in the catalytic slurry oil feed (or alternatively a ~343° C.+ portion of a feed) can be at least about 3 wt %, or at least about 5 wt %, or at least about 10 wt %, such as up to about 15 wt % or more.

In general, a catalytic slurry oil used as a feed for the various processes described herein can correspond to a product from FCC processing. In particular, a catalytic slurry oil can correspond to a bottoms fraction and/or other fraction having a boiling range greater than a typical light cycle oil from an FCC process.

The properties of catalytic slurry oils suitable for use in some aspects are described above. In order to generate such suitable catalytic slurry oils, the FCC process used for generation of the catalytic slurry oil can be characterized based on the feed delivered to the FCC process. For example, performing an FCC process on a light feed, such as a feed that does not contain NHI or MCR components, can tend to result in an FCC bottoms product with an IN of less than about 50. Such an FCC bottoms product can be blended with other feeds for hydroprocessing via conventional techniques. By contrast, the processes described herein can provide advantages for processing of FCC fractions (such as bottoms fractions) that have an IN of greater than about 50 (such as up to about 200 or more), for example about 60 to 140, or about 70 to about 130.

In general the operating conditions of a pyrolysis furnace for making a side product of SCT, which may be a typical pyrolysis furnace such as known per se in the art, can be determined by one of ordinary skill in the art in possession of the present disclosure without more than routine experimentation. Typical conditions will include a radiant outlet temperature of between 760-880° C., a cracking residence time period of 0.01 to 1 sec, and a steam dilution of 0.2 to 4.0 kg steam per kg hydrocarbon.

Particle Removal from Blends of Catalytic Slurry Oil and Steam Cracker Tar

In some aspects where the feed includes a catalytic slurry oil, particle removal can also be beneficial. Conventional methods for removing particles from a catalytic slurry oil can be used for such feeds, if desired.

In aspects where the feed corresponds to a blended feed including both a catalytic slurry oil portion and a steam cracker tar portion, it can be beneficial to perform particle removal on the feed prior to hydrotreatment. A number of difficulties in processing of feeds containing steam cracker tar can be related to the presence of coke fines. Coke fines can correspond to particles with sizes from a few microns to hundreds of microns. Steam cracker tar can also contain solvated precursors for forming additional coke fines. If a feed containing steam cracker tar is filtered or otherwise processed to remove coke fines, the precursor compounds in solution can precipitate to form additional coke fines. This can pose difficulties when attempting to process steam cracker tar under conventional conditions, as even if the coke fines initially present in a steam cracker tar fraction are removed, additional coke fines can form between filtration and processing in a fixed bed reactor. The coke fines can be of a sufficient size to cause plugging of the catalyst bed in a fixed bed reactor, leading to rapid reduction in the ability to effectively process a feed.

As noted above, a catalytic slurry oil fraction can initially contain catalyst fines. The catalyst fines in a catalytic slurry oil can optionally be removed prior to forming a blend of catalytic slurry oil and steam cracker tar. If catalyst fines are present in catalytic slurry oil when forming a blend with steam cracker tar, such catalyst fines can be removed by the techniques described herein for removing coke fines from the steam cracker tar portion of the blend.

Prior to filtration and/or other separation of particles from a blended feed of steam cracker tar and catalytic slurry oil, the blended feed can include at least about 100 wppm of particles having a particle size of 25 µm or greater, or at least about 200 wppm, or at least about 500 wppm. Additionally or alternately, the blended feed can include at least about 500 wppm of total particles, or at least about 1000 wppm, or at least about 2000 wppm. After separation to remove particles, a first effluent can be formed having a total particle content of less than about 500 wppm, or less than about 100 wppm. If necessary, total particle content can be defined based on particles having a particle size of 0.01 µm or greater. At least a second effluent can also be formed that includes at least about 200 wppm of particles having a particle size of 25 µm or greater, or at least about 500 wppm, such as up to about 5000 wppm or more.

In some aspects, coke fines, catalyst fines, and/or other particles in a blend of catalytic slurry oil and steam cracker tar can be removed using physical filtration based on particle size. This can correspond to passing the blended feed through a filter to form a permeate with a reduced particle content and a retentate enriched in particles. While this is potentially effective, it can be difficult to implement on a commercial scale, such as due to difficulties in maintaining a desired flow rate across a filter (or filters) and/or due to difficulties in having to take filter(s) off-line to allow for regeneration and maintenance.

In various aspects, an improved method of removing particles from a blended feed can correspond to removing a portion of particles from the blended feed by settling, followed by using electrostatic filtration to remove additional particles.

Settling can provide a convenient method for removing larger particles from a feed. During a settling process, the blended feed can be held in a settling tank or other vessel for a period of time. This time period can be referred to as a settling time. The blended feed can be at a settling temperature during the settling time. While any convenient settling temperature can potentially be used (such as a temperature from about 20° C. to about 200° C.), a temperature of about 100° C. or greater (such as at least 105° C., or at least 110° C.) can be beneficial for allowing the viscosity of the blended feed to be low enough to facilitate settling. Additionally or alternately, the settling temperature can be about 200° C. or less, or about 150° C. or less, or about 140° C. or less. In particular, the settling temperature can be about 100° C. to about 200° C., or about 105° C. to about 150° C., or about 110° C. to about 140° C. The upper end of the settling temperature can be less important, and temperatures of still greater than 200° C. may also be suitable. However, unless the blended feed is already at an elevated temperature for another reason, increasing the settling temperature to values greater than about 150° C. can provide a reduced or minimized marginal benefit for the settling process while requiring substantial additional amount of energy to maintain the temperature during the settling time.

After the settling time, the particles can be concentrated in a lower portion of the settling tank. The blended feed including a portion of catalytic slurry oil and a portion of steam cracker tar can be removed from the upper portion of the settling tank while leaving the particle enriched bottoms in the tank. The settling process can be suitable for reducing the concentration of particles having a particle size of about 25 µm or greater from the blended feed.

After removing the larger particles from the blended feed, the blended feed can then be passed into an electrostatic separator. An example of a suitable electrostatic separator can be a Gulftronic™ electrostatic separator available from General Atomic. An electrostatic separator can be suitable for removal of particles of a variety of sizes, including both larger particles as well as particles down to a size of about 5 μm or less or even smaller. However, it can be beneficial to remove larger particles using a settling process to reduce or minimize the accumulation of large particles in an electrostatic separator. This can reduce the amount of time required for flush and regeneration of an electrostatic separator.

In an electrostatic separator, dielectric beads within the separator can be charged to polarize the dielectric beads. A fluid containing particles for removal can then be passed into the electrostatic separator. The particles can be attracted to the dielectric beads, allowing for particle removal. After a period of time, the electrostatic separator can be flushed to allow any accumulated particles in the separator to be removed.

In various aspects, an electrostatic separator can be used in combination with a settling tank for particle removal. Performing electrostatic separation on an blended feed effluent from a settling tank can allow for reduction of the number of particles in a blended feed to about 100 wppm or less, or about 50 wppm or less, such as down to about 20 wppm or possibly lower. In particular, the concentration of particles in the blended feed after electrostatic separation can be about 0 wppm to about 100 wppm, or about 0 wppm to about 50 wppm, or about 1 wppm to about 20 wppm. In some aspects, a single electrostatic separation stage can be used to reduce the concentration of particles in the blended feed to a desired level. In some aspects, two or more electrostatic separation stages in series can be used to achieve a target particle concentration.

In an electrostatic separation stage, a plurality of electrostatic separators can be arranged in parallel. In addition to allowing for processing of a larger volume of feed at a single time, parallel operation can also allow a first group of one or more electrostatic separators to operate in separation mode while a second group of one or more electrostatic separators can be in a flush or regeneration mode. More generally, any convenient number of staggered cycles can be used to allow for continuous particle removal from a feed while allowing for flushing of separators to remove accumulated particles.

A cycle length for an individual electrostatic separator unit can correspond to any convenient cycle length based on the flow rate of feed into the unit and the density of suspended solids (i.e., particles) in the feed. Typical cycles can include a separation portion of a cycle having a length of about 1 minute to about 30 minutes and a flush or regeneration portion of about 1 minute to about 30 minutes.

Fixed Bed Hydrotreatment

After (optional) particle removal, a feed including a catalytic slurry oil (and optionally a portion of steam cracker tar) can be hydrotreated. An example of a suitable type of hydrotreatment can be hydrotreatment under trickle bed conditions or other fixed bed conditions. More generally, any convenient type of hydrotreatment can be used to generate a hydrotreated fraction as described herein. In some optional aspects, portions of a feed can be twice-hydroprocessed to further improve the feed quality for forming a specialty product.

It is noted that both steam cracker tar and typical catalytic slurry oils can correspond to feeds having an $I_N$ greater than 50. Conventionally, feeds having an $I_N$ of greater than about 50 have been viewed as unsuitable for fixed bed (such as trickle bed) hydroprocessing. This conventional view can be due to the belief that feeds with an $I_N$ of greater than about 50 are likely to cause substantial formation of coke within a reactor, leading to rapid plugging of a fixed reactor bed. Instead of using a fixed bed reactor, feeds with a high $I_N$ value are conventionally processed using other types of reactors that can allow for regeneration of catalyst during processing, such as a fluidized bed reactor or an ebullating bed reactor. Alternatively, during conventional use of a fixed bed catalyst for processing of a high $I_N$ feed, the conditions can be conventionally selected to achieve a low amount of conversion in the feed relative to a conversion temperature of ~1050° F. (~566° C.), such as less than about 30% to about 50% conversion. Based on conventional understanding, performing a limited amount of conversion on a high $I_N$ feed can be required to avoid rapid precipitation and/or coke formation within a fixed bed reactor.

In various aspects, a feed including a catalytic slurry oil (and optionally a portion of steam cracker tar) can be hydrotreated under effective hydrotreating conditions in a first hydrotreating stage or stages to form a hydrotreated effluent. Optionally, the effective hydrotreating conditions can be selected to allow for reduction of the n-heptane asphaltene content of the hydrotreated effluent to less than about 1.0 wt %, or less than about 0.5 wt %, or less than about 0.1 wt %, and optionally down to substantially no remaining n-heptane asphaltenes. Additionally or alternately, the effective hydrotreating conditions can optionally be selected to allow for reduction of the micro carbon residue content of the hydrotreated effluent to less than about 2.5 wt %, or less than about 1.0 wt %, or less than about 0.5 wt %, or less than about 0.1 wt %, and optionally down to substantially no remaining micro carbon residue.

Additionally or alternately, in various aspects, the combination of processing conditions can be selected to achieve a desired level of conversion of a feedstock, such as conversion relative to a conversion temperature of ~700° F. (~371° C.). For example, the process conditions can be selected to achieve at least about 20% conversion of the ~700° F.+ (~371° C.+) portion of a feedstock, or at least about 30 wt %, or at least about 40 wt %. Additionally or alternately, the conversion percentage can be about 70 wt % or less, or about 60 wt % or less, or about 50 wt % or less. In particular, the amount of conversion relative to 371° C. can be about 20 wt % to about 70 wt %, or about 20 wt % to about 60 wt %, or about 30 wt % to about 60 wt %. Optionally, the amount of conversion of 1050° F.+ (~566° C.+) components to 1050° F.- (~566° C.-) components can also be controlled. In some optional aspects, at least about 20 wt % of 1050° F.+ (~566° C.+) components can be converted to 1050° F.- (~566° C.-) components, or at least about 50 wt %, or at least about 70 wt %, or at least about 80 wt %, such as up to substantially complete conversion of ~566° C.+ components of the blended feed. In particular, the amount of conversion of ~566° C.+ components to ~566° C.- components can be about 20 wt % to about 100 wt %, or about 50 wt % to about 100 wt %, or about 70 wt % to about 100 wt %.

Hydroprocessing (such as hydrotreating) can be carried out in the presence of hydrogen. A hydrogen stream can be fed or injected into a vessel or reaction zone or hydroprocessing zone corresponding to the location of a hydroprocessing catalyst. Hydrogen, contained in a hydrogen "treat gas," can be provided to the reaction zone. Treat gas, as referred to herein, can be either pure hydrogen or a hydrogen-containing gas stream containing hydrogen in an amount in excess of that needed for the intended reaction(s). Treat gas can optionally include one or more other gasses (e.g., nitrogen and light hydrocarbons such as methane) that do not adversely interfere with or affect either the reactions or the products. Impurities, such as $H_2S$ and $NH_3$ are undesirable and can typically be removed from the treat gas before conducting the treat gas to the reactor. In aspects where the treat gas stream can differ from a stream that substantially consists of hydrogen (i.e., at least about 99 vol % hydrogen), the treat gas stream introduced into a reaction stage can contain at least about 50 vol %, or at least about 75 vol % hydrogen, or at least about 90 vol % hydrogen.

During hydrotreatment in a first hydrotreating stage or stages, a feedstream can be contacted with a hydrotreating catalyst under effective hydrotreating conditions which include temperatures in the range of about 625° F. to about 800° F. (~329° C. to ~427° C.), or about 680° F. to about 790° F. (~360° C. to ~421° C.); pressures in the range of about 10.4 MPag to about 41.6 MPag (~1500 psig to 6000 psig), or about 13.8 MPag to about 20.8 MPag (~2000 to 3000 psig); a liquid hourly space velocity (LHSV) of from about 0.1 to about 10 $hr^{-1}$, or about 0.1 to 5 $hr^{-1}$; and a hydrogen treat gas rate of from about 430 to about 2600 $Nm^3/m^3$ (~2500 to ~15000 SCF/bbl), or about 850 to about 1700 $Nm^3/m^3$ (~5000 to ~10000 SCF/bbl).

In an aspect, the hydrotreating step may comprise at least one hydrotreating reactor, and optionally may comprise two or more hydrotreating reactors arranged in series flow. A vapor separation drum can optionally be included after each hydrotreating reactor to remove vapor phase products from the reactor effluent(s). The vapor phase products can include hydrogen, $H_2S$, $NH_3$, and hydrocarbons containing four (4) or less carbon atoms (i.e., "$C_4$-hydrocarbons"). Optionally, a portion of the $C_3$ and/or $C_4$ products can be cooled to form liquid products. The effective hydrotreating conditions can be suitable for removal of at least about 70 wt %, or at least about 80 wt %, or at least about 90 wt % of the sulfur content in the feedstream from the resulting liquid products. Additionally or alternately, at least about 50 wt %, or at least about 75 wt % of the nitrogen content in the feedstream can be removed from the resulting liquid products. In some aspects, the final liquid product from the hydrotreating unit can contain less than about 500 wppm sulfur, or less than about 200 wppm sulfur, or less than about 100 wppm sulfur, such as down to about 20 wppm sulfur or possibly even lower. Additionally or alternately, in some aspects the combined sulfur and nitrogen content of the liquid portion of the hydrotreated effluent can be about 200 wppm or less, or about 100 wppm or less, or about 50 wppm or less, such as down to about 1 wppm or lower.

The effective hydrotreating conditions can optionally be suitable for incorporation of a substantial amount of additional hydrogen into the hydrotreated effluent. During hydrotreatment in such optional aspects, the consumption of hydrogen by the feed in order to form the hydrotreated effluent can correspond to at least about 1500 SCF/bbl (~260 $Nm^3/m^3$) of hydrogen, or at least about 1700 SCF/bbl (~290 $Nm^3/m^3$), or at least about 2000 SCF/bbl (~330 $Nm^3/m^3$), or at least about 2200 SCF/bbl (~370 $Nm^3/m^3$), such as up to about 5000 SCF/bbl (~850 $Nm^3/m^3$) or more. In particular, the consumption of hydrogen can be about 1500 SCF/bbl (~260 $Nm^3/m^3$) to about 5000 SCF/bbl (~850 $Nm^3/m^3$), or about 2000 SCF/bbl (~340 $Nm^3/m^3$) to about 5000 SCF/bbl (~850 $Nm^3/m^3$), or about 2200 SCF/bbl (~370 $Nm^3/m^3$) to about 5000 SCF/bbl (~850 $Nm^3/m^3$).

Hydrotreating catalysts suitable for use herein can include those containing at least one Group VIA metal and at least one Group VIII metal, including mixtures thereof. Examples of suitable metals include Ni, W, Mo, Co and mixtures thereof, for example CoMo, NiMoW, NiMo, or NiW. These metals or mixtures of metals are typically present as oxides or sulfides on refractory metal oxide supports. The amount of metals for supported hydrotreating catalysts, either individually or in mixtures, can range from ~0.5 to ~35 wt %, based on the weight of the catalyst. Additionally or alternately, for mixtures of Group VIA and Group VIII metals, the Group VIII metals can be present in amounts of from ~0.5 to ~5 wt % based on catalyst, and the Group VIA metals can be present in amounts of from 5 to 30 wt % based on the catalyst. A mixture of metals may also be present as a bulk metal catalyst wherein the amount of metal can comprise ~30 wt % or greater, based on catalyst weight.

Suitable metal oxide supports for the hydrotreating catalysts include oxides such as silica, alumina, silica-alumina, titania, or zirconia. Examples of aluminas suitable for use as a support can include porous aluminas such as gamma or eta. In some aspects where the support can correspond to a porous metal oxide support, the catalyst can have an average pore size (as measured by nitrogen adsorption) of about 30 Å to about 1000 Å, or about 50 Å to about 500 Å, or about 60 Å to about 300 Å. Pore diameter can be determined, for example, according to ASTM Method D4284-07 Mercury Porosimetry. Additionally or alternately, the catalyst can have a surface area (as measured by the BET method) of about 100 to 350 $m^2/g$, or about 150 to 250 $m^2/g$. In some aspects, a supported hydrotreating catalyst can have the form of shaped extrudates. The extrudate diameters can range from 1/32 to 1/8 inch (~0.7 to ~3.0 mm), from 1/20 to 1/10 inch (~1.3 to ~2.5 mm), or from 1/20 to 1/16 inch (~1.3 to ~1.5 mm). The extrudates can be cylindrical or shaped. Non-limiting examples of extrudate shapes include trilobes and quadralobes.

In some optional aspects, one or more fractions of the hydrotreated feed, such as one or more 454° C.+ fractions, can be hydroprocessed a second time to produce twice-hydroprocessed fractions. During hydroprocessing in a second hydroprocessing stage or stages, a feedstream can be exposed to hydrotreating conditions, aromatic saturation conditions, or a combination thereof. Second stage hydrotreating conditions can include contacting a feed with with a hydrotreating catalyst under effective hydrotreating conditions which include temperatures in the range of about 600° F. to about 800° F. (~316° C. to ~427° C.), or about 680° F. to about 790° F. (~360° C. to ~421° C.); pressures in the range of about 13.8 MPag to about 34.4 MPag (2000 psig to 5000 psig), or about 20.8 MPag to about 27.6 MPag (~3000 to ~4500 psig); a liquid hourly space velocity (LHSV) of from about 0.1 to about 10 $hr^{-1}$, or about 0.1 to 5 $hr^{-1}$; and a hydrogen treat gas rate of from about 430 to about 2600 $Nm^3/m^3$ (~2500 to ~15000 SCF/bbl), or about 850 to about 1700 $Nm^3/m^3$ (~5000 to ~10000 SCF/bbl). The hydrotreating catalyst can be a hydrotreating catalyst as described above.

In some aspects, aromatic saturation conditions in the second stage can be similar to the second stage hydrotreating conditions. Optionally, aromatic saturation conditions can correspond to higher pressure conditions and/or temperatures of about 425° C. or less. Optionally, aromatic saturation catalysts including Ni as a Group VIII metal can be beneficial for aromatic saturation in a reaction environment that includes at least 200 wppm of sulfur. In lower sulfur content environments, Group VIII noble metals can also have higher aromatic saturation activity. In some aspects, the hydrotreating catalyst and aromatic saturation catalyst can correspond to a stacked bed of catalyst. The aromatic saturation catalyst can correspond to any convenient type of aromatic saturation catalyst.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is about 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. Optionally, a hydrofinishing catalyst can include a hydrogenation metal supported on a crystalline material belonging to the M41S class or family of catalysts. The M41S family of catalysts are mesoporous materials having high silica content. Examples include MCM-41, MCM-48 and MCM-50.

Product Properties—Hydrotreated Effluent

The intermediate and/or final products from hydrotreatment of a feed can be characterized in various manners. One type of product that can be characterized can be the hydrotreated effluent derived from hydrotreatment of a blended feed. Additionally or alternatively, the hydrotreated effluent derived from hydrotreatment of a blended feed may be fractionated into distillate and residual range portions. The distillate and/or residual range portions can be characterized.

After hydrotreatment, the liquid ($C_3+$) portion of the hydrotreated effluent can have a volume of at least about 95% of the volume of the blended feed, or at least about 100% of the volume of the feed, or at least about 105%, or at least about 110%, such as up to about 150% of the volume. In particular, the yield of $C_3+$ liquid products can be about 95 vol % to about 150 vol %, or about 110 vol % to about 150 vol %. Optionally, the $C_3$ and $C_4$ hydrocarbons can be used, for example, to form liquefied propane or butane gas as a potential liquid product. Optionally, the $C_4$ hydrocarbons can be included as part of a naphtha boiling range product. Therefore, the $C_3+$ portion of the effluent can be counted as the "liquid" portion of the effluent product, even though a portion of the compounds in the liquid portion of the hydrotreated effluent may exit the hydrotreatment reactor (or stage) as a gas phase at the exit temperature and pressure conditions for the reactor.

After hydrotreatment, the boiling range of the liquid ($C_3+$) portion of the hydrotreated effluent can be characterized in various manners. In some aspects, the total liquid product can have a T50 distillation point of about 320° C. to about 400° C., or about 340° C. to about 390° C., or about 350° C. to about 380° C. In some aspects, the total liquid product can have a T90 distillation point of about 450° C. to about 525° C. In some aspects, the total liquid product can have a T10 distillation point of at least about 250° C., which can reflect the low amount of conversion that occurs during hydroprocessing of higher boiling compounds to $C_3+$ compounds with a boiling point below 200° C. In some aspects, the (weight) percentage of the liquid ($C_3+$) portion that comprises a distillation point greater than about ~566° C. can be about 2 wt % or less, such as about 1.5 wt % or less, about 1.0 wt % or less, about 0.5 wt % or less, about 0.1 wt % or less, or about 0.05 wt % or less (i.e., substantially no compounds with a distillation point greater than about 1050° F./~566° C.). Additionally or alternately, the (weight) percentage of the liquid portion that comprises a distillation point less than about ~371° C. can be at least about 40 wt %, or at least about 50 wt %, or at least about 60 wt %, such as up to about 90 wt % or more.

In some aspects, the density (at 15° C.) of the liquid ($C_3+$) portion of the hydrotreated effluent can be about 1.05 g/cc or less, such as about 1.02 g/cc or less, about 1.00 g/cc or less, about 0.98 g/cc or less, about 0.96 g/cc or less, about 0.94 g/cc or less, about 0.92 g/cc or less, such as down to about 0.84 g/cc or lower. In particular, the density can be about 0.84 g/cc to about 1.02 g/cc, or about 0.92 g/cc to about 1.02 g/cc, or about 0.84 g/cc to about 1.00 g/cc. Additionally or alternately, the API gravity of the liquid portion of the hydrotreated effluent can be at least 0, or at least 5, or at least 10. In particular, the API gravity can be 5 to 25, or 7 to 15. In some aspects, the API gravity of the hydrotreated effluent can be increased relative to the API gravity of the feed, such as a blended feed including both catalytic slurry oil and steam cracker tar. For example, the API gravity of the hydrotreated effluent (or the liquid portion thereof) can be at least 5 greater than the API gravity of the feed, or at least 10 greater, or at least 15 greater, such as up to 25 greater or more.

The micro carbon residue of the liquid ($C_3+$) portion of the hydrotreated effluent can be about 4.0 wt % or less, or about 3.0 wt % or less, or about 2.5 wt % or less, or about 2.0 wt % or less, or about 1.0 wt % or less, or about 0.5 wt % or less, such as substantially complete removal of micro carbon residue. In particular, the micro carbon residue can be about 0 wt % to about 3.0 wt %, or about 0 wt % to about 2.0 wt %, or about 0 wt % to about 1.0 wt %.

The aromatics content of the liquid portion of the hydrotreated effluent can be substantially reduced relative to the feed. In various aspects, the aromatics content of the liquid portion of the hydrotreated effluent can be about 50 wt % or less, or about 40 wt % or less, or 30 wt % or less, or 25 wt % or less, such as down to about 10 wt % or still lower. Reducing the aromatic content to less than 50 wt % (or still lower) can facilitate performing fractionation on the hydrotreated effluent. Optionally, the amount of reduction in aromatics content in the hydrotreated effluent relative to the feed can be at least 25 wt % reduction in aromatics, or at least 35 wt %, or at least 45 wt %.

The amount of n-heptane insolubles (NHI) in the liquid ($C_3+$) portion of the hydrotreated effluent, as determined by ASTM D3279, can be about 2.0 wt % or less, or about 1.5 wt % or less, or about 1.0 wt % or less, or about 0.5 wt % or less, or about 0.1 wt % or less, such as substantially complete removal of NHI. Additionally or alternately, the amount of NHI in the liquid portion of the hydrotreated effluent can be less than 50 wt % of the amount of NHI in the feed to hydrotreatment, less than 60 wt % of the NHI in the feed, or less than 70 wt %.

The hydrogen content of the liquid ($C_3+$) portion of the hydrotreated effluent can be at least about 9.5 wt %, or at least about 10.0 wt %, or at least about 10.5 wt %, or at least about 11.0 wt %, or at least about 11.5 wt %. In particular, the hydrogen content can be about 9.5 wt % to about 12.0 wt %, or about 10.5 wt % to about 12.0 wt %, or about 11.0 wt % to about 12.0 wt %.

After hydrotreatment at a temperature of about 329° C. to 427° C., a LHSV of 0.1 hr$^{-1}$ to 1.0 hr$^{-1}$, and a pressure of about 10.3 MPag to about 20.8 MPag, about 20 wt % to 60 wt % of the feedstock can be converted relative to 700° F. (371° C.). In some aspects, the conditions can have sufficient severity so that the 700° F.− (371° C.−) product has a sulfur content of less than about 20 wppm. This can make the 371° C.− product suitable for inclusion into a diesel pool, such as an ultra low sulfur diesel pool. The 700° F.+ (371° C.+) portion of the hydrotreated effluent can be fractionated into a plurality of narrow cuts. A remaining bottoms stream can have a T10 distillation point of about 950° F. (510° C.) to about 1050° F. (566° C.). The narrow cuts can then be further processed separately and/or in various combinations to make desired specialty products.

In some aspects, the 850° F.+ (454° C.+) portion of the hydrotreated effluent can be suitable for use in producing various specialty products. The 454° C.+ portion of the hydrotreated effluent can include about 50 wt % to about 100 wt % of polycyclic hydrocarbonaceous compounds (such as polycyclic hydrocarbons), or about 60 wt % to about 100 wt %, or about 70 wt % to about 100 wt %.

In some aspects, one or more cuts from the 454° C.+ portion can undergo further hydroprocessing prior to forming specialty products. The additional hydroprocessing can include hydrotreatment, aromatic saturation, or a combination thereof. If additional hydroprocessing is performed, the twice-hydroprocessed cuts can include aromatics, but the aromatics can be substantially all naphthenoaromatics. In some aspects, the total content of aromatics in any twice-hydroprocessed portions of the 454° C.+ fraction can be about 5 wt % to 70 wt %, or about 10 wt % to about 60 wt %, or about 15 wt % to 50 wt %, while the content of aromatics different from naphthenoaromatics can be about 2.0 wt % or less, or about 1.0 wt % or less, or about 1000 wppm or less, such as down to substantially no content (0%) of aromatics different from naphthenoaromatics. In other aspects, the total content of aromatics in any twice-hydroprocessed portions of the 454° C.+ fraction can be about 0.1 wt % to 5.0 wt %, or about 0.1 wt % to about 2.5 wt %, or about 1.0 wt % to about 5.0 wt %, while the content of aromatics different from naphthenoaromatics can be about 1.0 wt % or less, or about 1000 wppm or less, such as down to substantially no content (0%) of aromatics different from naphthenoaromatics. In some aspects, relative to the weight of polycyclic hydrocarbonaceous compounds, at least 50 wt % of the polycyclic hydrocarbonaceous compounds can be naphthenes, or at least 60 wt %, or at least 70 wt %, or at least 80 wt %, such as up to 100 wt %. With regard to the naphthenoaromatics present in any twice-hydrotreated portions of the 454° C.+ fraction, about 2000 wppm or less of the naphthenoaromatics can correspond to naphthenoaromatics containing 4 or more aromatic rings, or about 1000 wppm or less, or about 500 wppm or less, such as down to substantially no content (0%) of naphthenoaromatics having 4 or more aromatic rings. Additionally or alternately, the paraffin content of such a fraction can be about 10 wt % or less, or about 5.0 wt % or less, or about 2.0 wt % or less. As an example, such a fraction can have a T10 boiling point of at least 510° C., a T50 boiling point of at least 566° C., and/or a T90 boiling point of 621° C. or less. In the claims below, total ring content, naphthene content, and naphthenoaromatic content in a sample can be determined using FTICR-MS, optionally in combination with $^{13}$C-NMR. Aromatics content can be determined by $^{13}$C-NMR.

Example of Hydrotreatment Configuration

FIG. 1 schematically shows an example of a reaction system for processing a feed including a catalytic slurry oil or including both catalytic slurry oil and steam cracker tar. The configuration in FIG. 1 can be used when particle removal is desired from the feed prior to hydrotreatment. In FIG. 1, an initial feed 105 can be introduced into a settling tank 110. The feed can remain in the settling tank for a sufficient amount of time to allow for separation of the blended feed into a settler effluent 112 having a reduced content of particles and a settler bottoms 118 having an increased content of particles. The settler effluent 112 can exit from the settler via a settler outlet and then be passed through one or more electrostatic separators, such as electrostatic separators 120 and 121, to produce an electrostatically separated settler effluent 122 having a further reduced particle content. The electrostatically separated settler effluent 122 can then be passed into fixed bed hydroprocessing reactor 130, such as a hydrotreating reactor, to produce a hydroprocessed effluent 135. Alternatively, particle removal can be performed by any other convenient method, so that feed 105 is passed through a particle removal stage and then hydroprocessed in hydroprocessing reactor 130. Hydroprocessed effluent 135 can then optionally be separated into one or more desired fractions, such as by separation in a fractionator 140. This can allow for formation of, for example, one or more light ends fractions 142, one or more naphtha boiling range fractions 144, one or more diesel boiling range fractions 146, and/or one or more heavier or bottoms fractions 148. In the exemplary reaction system shown in FIG. 1, two electrostatic separators 120 and 121 are shown that operate in parallel. This can allow one electrostatic separator (such as separator 120) to remove particles from settler effluent 112 while a second electrostatic separator 121 can be in a flush or regeneration cycle. More generally, any convenient number of electrostatic separators can be used, such as having electrostatic separator 120 represent a plurality of separators and having electrostatic separator 121 represent a plurality of separators. The regeneration effluent 126 can be used, for example, as a feed for a coker or fluid catalytic cracking unit. Optionally, a portion 127 of the regeneration effluent 126 can be recycled back to settling tank 110.

CONFIGURATION EXAMPLES

Carbon black can be formed by various industrial methods. One example of a method for forming carbon black is the furnace black process. Carbon black can be formed by blowing petroleum oil or coal oil as raw material (i.e., feedstock) into high-temperature gases to partially combust the feedstock. This type of method is suitable for mass production due to having a high yield. Additionally, the furnace black method can allow for control over some properties such as particle size and/or particle structure.

Figure 2:
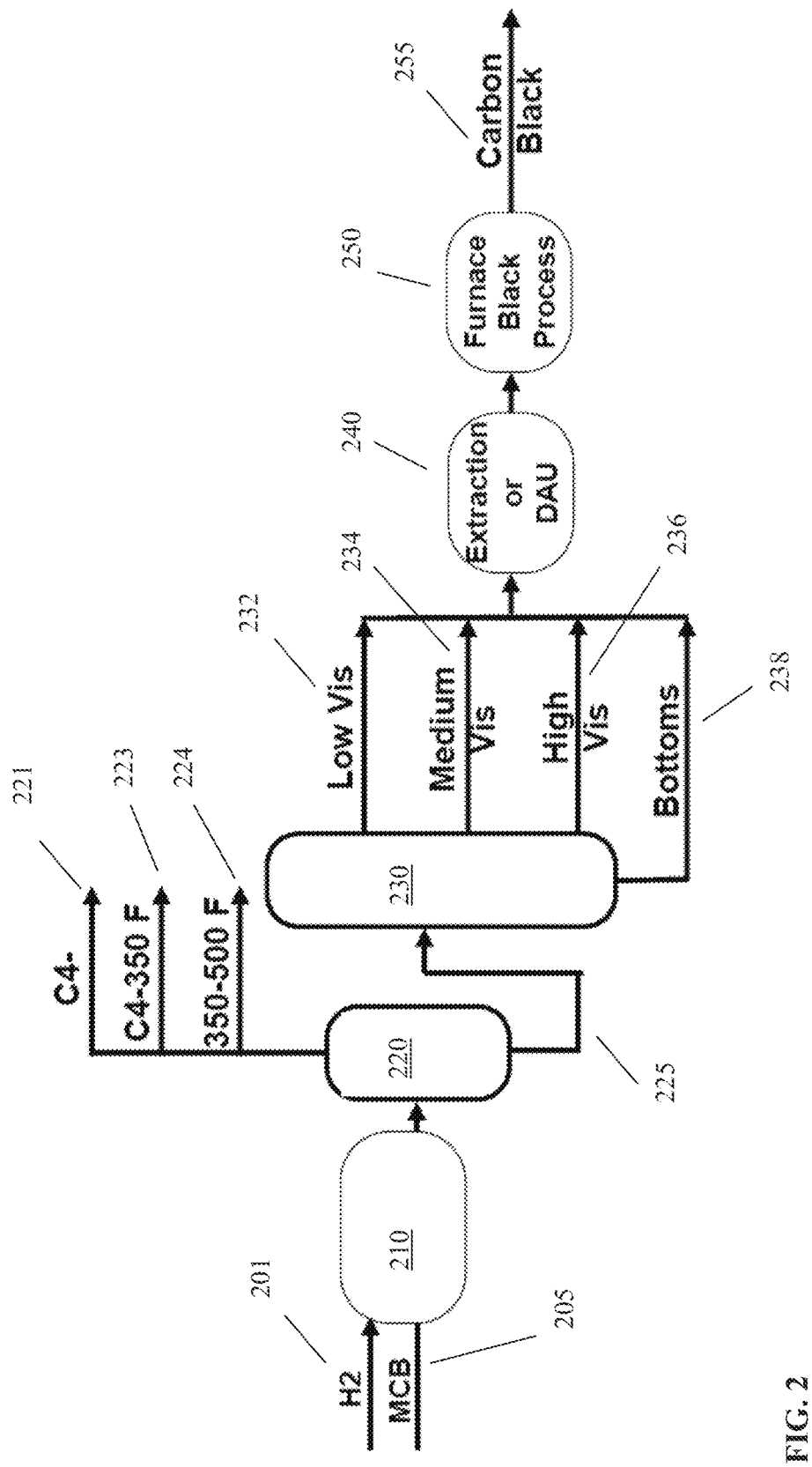
FIG. 2 shows an example of a reaction system for processing a feed to form carbon black.

FIG. 2 shows an example of a configuration suitable for production of carbon black from a catalytic slurry oil and/or steam cracker tar feed. In the example configuration shown in FIG. 2, any desired particle removal from the feed has already been performed. In other configurations, a particle removal stage can optionally be included (such as settling tank 110 and/or electrostatic separators 120 and 121 from FIG. 1).

In FIG. 2, a feed 205 including catalytic slurry oil (also referred to as main column bottoms, or MCB) and/or steam cracker tar is introduced into a first hydrotreating stage 210 along with hydrogen treat gas 201. The hydrotreated effluent 215 from hydrotreating stage 210 can then be fractionated, such as by using a sequence of an atmospheric distillation tower 220 and a vacuum distillation tower 230. Atmospheric distillation tower 220 can separate out one or more lower boiling range fractions from an atmospheric bottoms 225. The one or more lower boiling range fractions can include, for example, a light ends fraction 221, one or more naphtha boiling range fractions 223 (such as a $C_4$-177° C. fraction), and/or one or more distillate fuel boiling range fractions 224. In the example shown in FIG. 2, the distillate fuel fraction 224 has a boiling range of 177° C. to 260° C. In other aspects, the one or more distillate fuel fractions 224 can have a T95 distillation point of at least about 316° C., such as about 343° C. or less, or about 371° C. or less.

The atmospheric bottoms 225 can be further fractioned in vacuum distillation tower 230. The vacuum distillation tower can form any convenient number of fractions. In the example shown in FIG. 2, four types of fractions are shown, corresponding to one or more low viscosity fractions 232, one or more medium viscosity fractions 234, one or more high viscosity fractions 236 and a bottoms fraction 238. Various combinations of narrow boiling range fractions can be produced, depending on a desired composition of the resulting carbon black product. For example, it may be desirable to produce a total of ten fractions, such as three low viscosity fractions 232, three medium viscosity fractions 234, three high viscosity fractions 236, and a bottoms fraction 238. In this type of example, each fraction may have a boiling range (based on the range between T5-T95 distillation points) of about 40° F. to about 70° F. (~20° C.-~40° C.). Generating a plurality of narrow boiling range cuts can be beneficial for allowing production of different types of carbon black fractions. For example, producing carbon black using a low viscosity fraction and a high viscosity fraction as a feed can result in a different type of carbon black product than a carbon black produced using a medium viscosity fraction.

After fractionation, one or more of the fractions from vacuum distillation tower 230 can optionally be solvent processed 240 by solvent extraction and/or deasphalting to form a polynuclear aromatic-enriched (PNA-enriched) portion and a portion enriched in polynuclear naphthenes and/or polynuclear naphthenoaromatics. PNA-enriched portions can be composed substantially of polynuclear aromatics containing three to five aromatic rings. Such PNA-enriched portions can be beneficial feedstocks for production of carbon black and/or other types of specialty products. The portions enriched in polynuclear naphthenes and/or polynuclear naphthenoaromatics can be beneficial for production of resins and adhesives.

After optional solvent processing 240, any fractions desired for production of carbon black can be passed into a carbon black production process 250. An example of a carbon black production process can be a furnace black process as described above. Depending on the number of different combinations of fractions passed into the carbon black production process 250, one or more types of carbon black 255 can be produced. Although FIG. 2 is directed to carbon black formation, if desired a hydrogenation process for resin formation or a carbon fiber production process can be substituted for the carbon black formation process 250.

Figure 3:
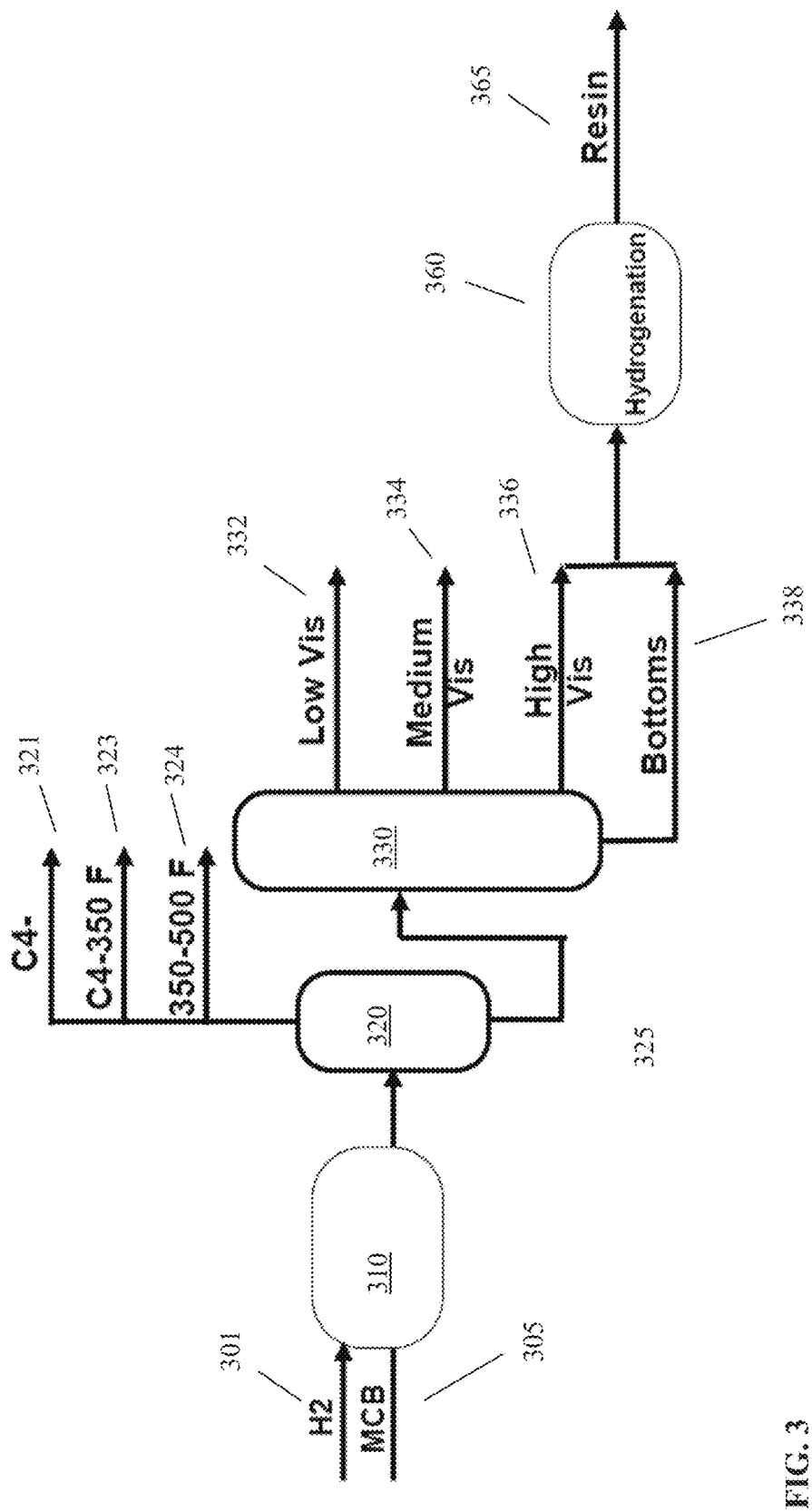
FIG. 3 shows an example of a reaction system for processing a feed to form resins or adhesives.

FIG. 3 shows an example of a configuration suitable for production of resins and/or adhesives from a catalytic slurry oil and/or steam cracker tar feed. In the example configuration shown in FIG. 3, any desired particle removal from the feed has already been performed. In other configurations, a particle removal stage can optionally be included (such as settling tank 110 and/or electrostatic separators 120 and 121 from FIG. 1).

In FIG. 3, a feed 305 including catalytic slurry oil and/or steam cracker tar is introduced into a first hydrotreating stage 310 along with hydrogen treat gas 301. The hydrotreated effluent 315 from hydrotreating stage 310 can then be fractionated, such as by using a sequence of an atmospheric distillation tower 320 and a vacuum distillation tower 330. Atmospheric distillation tower 320 can separate out one or more lower boiling range fractions from an atmospheric bottoms 325. The one or more lower boiling range fractions can include, for example, a light ends fraction 321, one or more naphtha boiling range fractions 323 (such as a $C_4$-177° C. fraction), and/or one or more distillate fuel boiling range fractions 324. In the example shown in FIG. 3, the distillate fuel fraction 324 has a boiling range of 177° C. to 260° C. In other aspects, the one or more distillate fuel fractions 324 can have a T95 distillation point of at least about 316° C., such as about 343° C. or less, or about 371° C. or less.

The atmospheric bottoms 325 can be further fractioned in vacuum distillation tower 330. The vacuum distillation tower can form any convenient number of fractions. In the example shown in FIG. 3, four types of fractions are shown, corresponding to one or more low viscosity fractions 332, one or more medium viscosity fractions 334, one or more high viscosity fractions 336 and a bottoms fraction 338. Various combinations of narrow boiling range fractions can be produced, depending on a desired composition of the resulting resin and/or adhesive product. For example, it may be desirable to produce a total of ten fractions, such as three low viscosity fractions 332, three medium viscosity fractions 334, three high viscosity fractions 336, and a bottoms fraction 338. In this type of example, each fraction may have a boiling range (based on the range between T5-T95 distillation points) of about 40° F. to about 70° F. (~20° C.-~40° C.). Generating a plurality of narrow boiling range cuts can be beneficial for allowing production of different types of specialty products.

After fractionation, one or more of the fractions from vacuum distillation tower 330 can optionally be solvent processed by solvent extraction and/or deasphalting to form a polynuclear aromatic-enriched (PNA-enriched) portion and a portion enriched in polynuclear naphthenes and/or polynuclear naphthenoaromatics. A solvent processing stage is not shown in FIG. 3, but can be included in a manner similar to the solvent processing stage in FIG. 2. PNA-enriched portions can be composed substantially of polynuclear aromatics containing three to five aromatic rings. Such PNA-enriched portions can be beneficial feedstocks for production of carbon black and/or other types of specialty products. The portions enriched in polynuclear naphthenes and/or polynuclear naphthenoaromatics can be beneficial for production of resins and adhesives.

After optional solvent processing, any fractions desired for production of resins and/or adhesives can be passed into a second hydroprocessing stage 360. In the example shown in FIG. 3, second hydroprocessing stage 360 can correspond to a high pressure hydroprocessing stage operated at a pressure of about 3000 psig to about 4000 psig. Such a second hydroprocessing stage 360 can include both hydrotreating catalyst and aromatic saturation catalyst, such as in a stacked bed configuration, to allow for production of a hydroprocessed effluent 365 that includes less than about 20 wppm of sulfur, less than about 20 wppm of nitrogen, and a reduced or minimized content of polynuclear aromatics. In the configuration shown in FIG. 3, the high viscosity fraction(s) 346 and the bottoms fraction 348 are used as feeds to the second hydroprocessing stage 360. This can correspond to, for example, the fractions having a T5 distillation point of at least about 800° F. (427° C.), or at least about 850° F. (454° C.).

Figure 4:
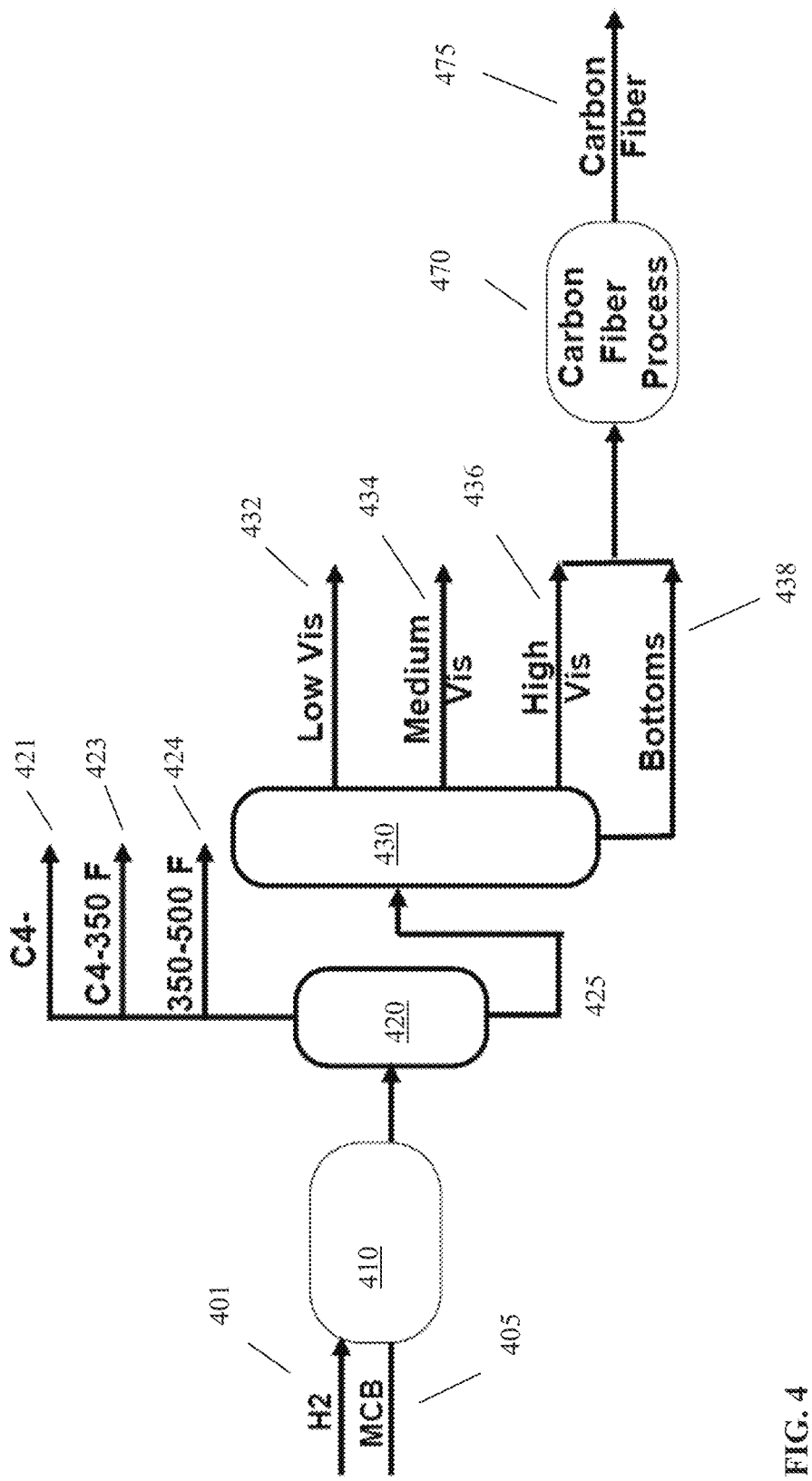
FIG. 4 shows an example of a reaction system for processing a feed to form carbon fiber.

FIG. 4 shows an example of a configuration suitable for production of carbon fibers from a catalytic slurry oil and/or steam cracker tar feed. In the example configuration shown in FIG. 4, any desired particle removal from the feed has already been performed. In other configurations, a particle removal stage can optionally be included (such as settling tank 110 and/or electrostatic separators 120 and 121 from FIG. 1).

In FIG. 4, a feed 405 including catalytic slurry oil and/or steam cracker tar is introduced into a first hydrotreating stage 410 along with hydrogen treat gas 401. The hydrotreated effluent 415 from hydrotreating stage 410 can then be fractionated, such as by using a sequence of an atmospheric distillation tower 420 and a vacuum distillation tower 430. Atmospheric distillation tower 420 can separate out one or more lower boiling range fractions from an atmospheric bottoms 425. The one or more lower boiling range fractions can include, for example, a light ends fraction 421, one or more naphtha boiling range fractions 423 (such as a $C_4$-177° C. fraction), and/or one or more distillate fuel boiling range fractions 424. In the example shown in FIG. 4, the distillate fuel fraction 424 has a boiling range of 177° C. to 260° C. In other aspects, the one or more distillate fuel fractions 424 can have a T95 distillation point of at least about 316° C., such as about 343° C. or less, or about 371° C. or less.

The atmospheric bottoms 425 can be further fractioned in vacuum distillation tower 430. The vacuum distillation tower can form any convenient number of fractions. In the example shown in FIG. 4, four types of fractions are shown, corresponding to one or more low viscosity fractions 432, one or more medium viscosity fractions 434, one or more high viscosity fractions 436 and a bottoms fraction 438. Various combinations of narrow boiling range fractions can be produced, depending on a desired composition of the resulting carbon fiber product. For example, it may be desirable to produce a total of ten fractions, such as three low viscosity fractions 432, three medium viscosity fractions 434, three high viscosity fractions 436, and a bottoms fraction 438. In this type of example, each fraction may have a boiling range (based on the range between T5-T95 distillation points) of about 40° F. to about 70° F. (~20° C.-~40° C.). Generating a plurality of narrow boiling range cuts can be beneficial for allowing production of different types of specialty products.

After fractionation, one or more of the fractions from vacuum distillation tower 330 can optionally be solvent processed by solvent extraction and/or deasphalting to form a polynuclear aromatic-enriched (PNA-enriched) portion and a portion enriched in polynuclear naphthenes and/or polynuclear naphthenoaromatics. A solvent processing stage is not shown in FIG. 3, but can be included in a manner similar to the solvent processing stage in FIG. 2. PNA-enriched portions can be composed substantially of polynuclear aromatics containing three to five aromatic rings. Such PNA-enriched portions can be beneficial feedstocks for production of carbon black and/or other types of specialty products. The portions enriched in polynuclear naphthenes and/or polynuclear naphthenoaromatics can be beneficial for production of resins and adhesives.

After optional solvent processing, any fractions desired for production of carbon fibers can be passed into an oligomerization stage 470. In the configuration shown in FIG. 3, the high viscosity fraction(s) 446 and the bottoms fraction 448 are used as feeds to the oligomerization process 460 for production of carbon fibers. This can correspond to, for example, the fractions having a T5 distillation point of at least about 800° F. (427° C.), or at least about 850° F. (454° C.).

Example 1—Fixed Bed Hydrotreatment of Catalytic Slurry Oil

Catalytic slurry oils derived from a plurality of FCC processes were mixed together to form a combined catalytic slurry oil feed. The combined catalytic slurry oil feed had a T10 distillation point of about 670° F. (~354° C.), a T50 of about 800° F. (~427° C.), and a T90 of about 1000° F. (~538° C.). The combined catalytic slurry oil feed included about 12 wt % micro carbon residue, about 3 wt % sulfur, a nitrogen content of about 2500 wppm, and a hydrogen content of about 7.4 wt %. The combined catalytic slurry oil feed had a density of about 1.12 g/cm$^3$ and included about 10 wt % saturates, about 70 wt % 4+ ring aromatics, and about 20 wt % 1 to 3 ring aromatics. The combined catalytic slurry oil was also filtered prior to processing to remove catalyst fines so that a resulting permeate had a total particle content of less than about 25 wppm. The filtered permeate formed from the combined catalytic slurry oil feed was hydrotreated in a fixed bed hydrotreatment unit (pilot scale) in the presence of a commercially available supported medium pore NiMo hydrotreatment catalyst.

At the beginning of the run the hydrotreatment conditions included a pressure of about 2600 psig (~17.9 MPag), an LHSV of about 0.25 hr$^{-1}$, a temperature of about 370° C., and a hydrogen treat gas rate of about 10,000 SCF/bbl (~1700 Nm$^3$/m$^3$). These conditions were sufficient to reduce the sulfur content of the total liquid effluent to about 150 wppm. At start of run, fractionation of the total product resulted in 3 wt % H$_2$S, 1 wt % $C_4$—, 5 wt % naphtha ($C_5$—177° C.), 47 wt % diesel boiling range product (177° C.-371° C.) having a sulfur content of less than 10 wppm, and 45 wt % of 371° C.+ product (including ~2.5 wt % of 566° C.+ product). The 371° C.+ product had a specific gravity of about 1.0 g/cm$^3$ and was suitable for use as a hydrocracker feed, an FCC feed, or for sale as a fuel oil.

The reactor was run for roughly 300 days. At the end of the run the hydrotreatment conditions included a pressure of about 2600 psig (~17.9 MPag), an LHSV of about 0.25 hr$^{-1}$, a temperature of about 410° C., and a hydrogen treat gas rate of about 10,000 SCF/bbl (~1700 Nm$^3$/m$^3$). The sulfur content in the total liquid effluent at end of run was about 117 wppm. At end of run, fractionation of the total product resulted in 3 wt % H$_2$S, 3 wt % $C_4$—, 8 wt % naphtha ($C_5$—177° C.), 45 wt % diesel boiling range product (177° C.-371° C.) having a sulfur content of less than 10 wppm, and 41 wt % of 371° C.+ product. At end of run, the conversion rate for the 566° C.+ portion of the initial feed was greater than about 90%. The 371° C.+ product had a specific gravity of about 1.0 g/cm$^3$ and was suitable for use as a hydrocracker feed, an FCC feed, or for sale as a fuel oil.

Figure 5:
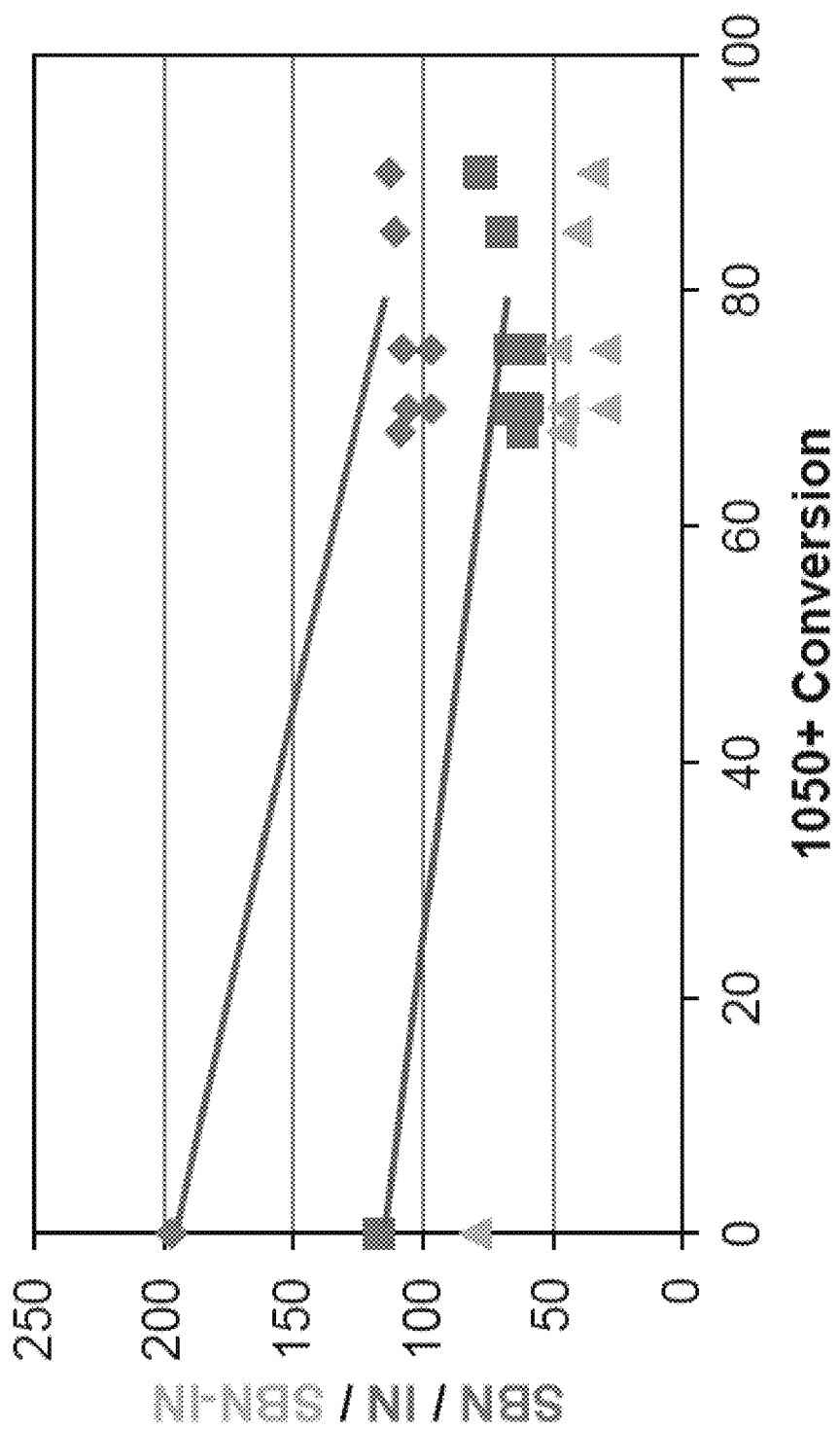
FIG. 5 shows results from hydrotreatment of a catalytic slurry oil.

The increases in temperature to maintain the target sulfur in the effluent resulted in additional conversion over the course of the run. Although the higher temperatures shifted the boiling range distribution toward lighter products, the reactor otherwise remained stable for hydroprocessing throughout the run. This stability can be seen, for example, in the relationship between $I_N$ and $S_{BN}$ for the liquid effluent over the course of the run. FIG. 5 shows $I_N$, $S_{BN}$, and $S_{BN}-I_N$ as a function of 1050° F.+ (566° C.+) conversion during the run for processing of the catalytic slurry oil feed. The diamonds in FIG. 5 correspond to $S_{BN}$ values as a function of 566° C.+ conversion, the squares correspond to $I_N$ values as a function of conversion, and the triangles correspond to differences between the $S_{BN}$ and $I_N$ values at a given amount of conversion. The upper line in FIG. 5 corresponds to a fit to the $S_{BN}$ values, while the lower line in FIG. 5 corresponds to a fit to the $I_N$ values. As shown in FIG. 5, the $I_N$ remained sufficiently below the $S_{BN}$ for the products at all conversion values so that precipitation of asphaltenes and/or other particles did not occur within the reactor.

Example 2—Fixed Bed Hydrotreatment of Steam Cracker Tar

A steam cracker tar feed was hydrotreated under conditions similar to the conditions from Example 1. The steam cracker tar feed had a T10 distillation point of about 420° F. (~216° C.), a T50 of about 680° F. (~360° C.), and a T90 of about 1300° F. (~704° C.). The blended feed included about 22 wt % micro carbon residue, about 3.3 wt % sulfur, a nitrogen content of about 1100 wppm, and a density of 1.16 g/cm³. The steam cracker tar feed was filtered to form a permeate having a total particle content to less than about 25 wppm. The permeate was exposed to a supported medium pore NiMo catalyst in a pilot testing unit similar to the configuration used in Example 2. After 7 days of processing the pressure drop in the unit was greater than 100 psig (~0.7 MPag), which made further processing impractical. The catalyst in the reactor was fused together with coke and had to be drilled out of the reactor.

Example 3—Hydrotreatment of Blended Feed (Catalytic Slurry Oil and SCT)—Comparison at Constant Severity A catalytic slurry oil and the steam cracker tar of Example 2 were mixed in a weight ratio of 80:20 to form a blended feed. The blended feed had a T10 distillation point of about 550° F. (~288° C.), a T50 of about 782° F. (~417° C.), and a T90 of about 984° F. (~529° C.). The blended feed included about 12 wt % micro carbon residue, about 3 wt % sulfur, a nitrogen content of about 1600 wppm, and a density of about 1.11 g/cm³. As noted above, the feed was filtered prior to hydrotreatment to reduce the total particle content to less than 25 wppm. The feed was exposed to a supported medium pore NiMo catalyst similar to the catalyst of Example 2 in a pilot scale fixed bed reactor. In this example, the reaction conditions were maintained at roughly constant severity, including constant temperature. The reaction conditions included a pressure of about 2000 psig (~13.8 MPag), an LHSV of either about 0.3 hr$^{-1}$ or about 0.5 hr$^{-1}$, a temperature of about 370° C., and a hydrogen treat gas rate of about 10,000 SCF/bbl (~1700 Nm³/m³). Initially, the catalyst was exposed to a feed including just the catalytic slurry oil for 42 days. The feed was then switched to the blended feed for an additional 48 days. No plugging was observed in the reactor.

Figure 6:
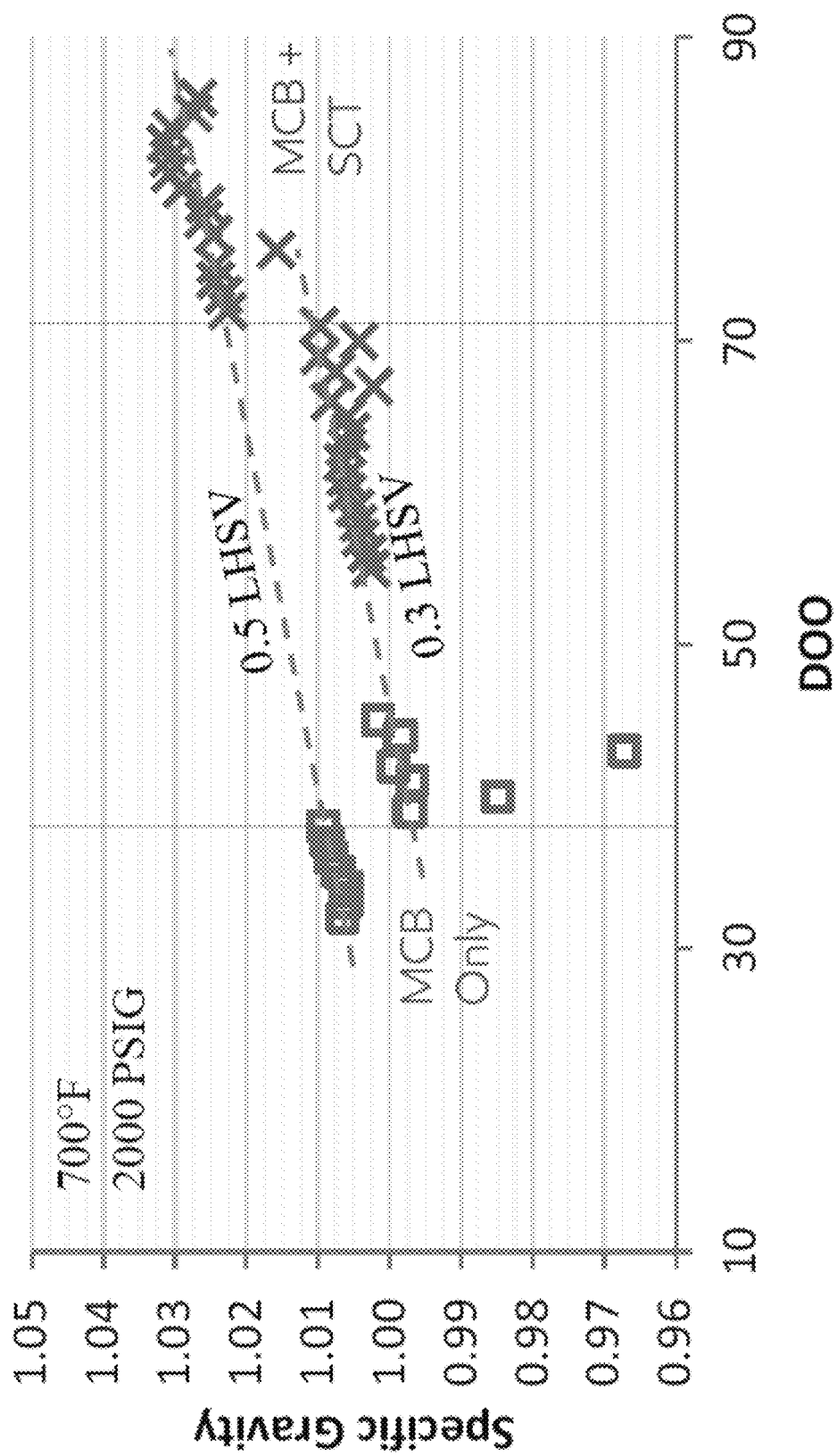
FIG. 6 shows results from hydrotreatment of a catalytic slurry oil relative to results for hydrotreatment of a blended feed.

FIG. 6 shows the total liquid product density from the processing run over the course of the 90 days on oil (D00). The squares in the left portion of FIG. 6 (initial part of the processing run) correspond to a feed composed only of "main column bottoms" or MCB, which is another term used to refer to catalytic slurry oil. The "x" symbols in the right portion of FIG. 6 correspond to a feed including catalytic slurry oil and 20 wt % of steam cracker tar (SCT). As shown in FIG. 6, the addition of 20 wt % SCT to the catalytic slurry oil did not result in a change in the processing trend line for the density of the total liquid effluent at either of the tested space velocities. It is noted that the temperature was maintained at about 370° C. during these runs, as opposed to increasing the temperature to maintain a desired sulfur target. Thus, the increased sulfur content from processing the blended feed is believed to be substantially due to typical catalyst deactivation that is typically compensated for by increasing the temperature during the course of a processing run.

FIG. 7 provides a further comparison of the properties of the feeds tested in this example and the resulting hydrotreated liquid effluents. As shown in FIG. 7, other than boiling point differences related to the differences between the feeds, the hydrotreated effluent from processing of the blended feed was qualitatively similar to the hydrotreated effluent from processing of the catalytic slurry oil. This was unexpected given the conventional wisdom that SCT is not suitable for fixed bed hydrotreatment, as well as in view of the results from Example 2.

Example 4—Hydrotreatment of Blended Feed (Catalytic Slurry Oil and SCT)

The catalytic slurry oil of Example 1 and the steam cracker tar of Example 2 were mixed in an 80:20 weight ratio to form a blended feed. The blended feed was filtered to reduce the total particle content to less than about 25 wppm. The blended feed was processed in the presence of a catalyst similar to the catalyst in Example 1, and in a reactor similar to the reactor in Example 1. The blended feed in this example had a T10 distillation point of about 583° F. (~306° C.), a T50 of about 786° F. (~419° C.), and a T90 of about 1020° F. (~549° C.). The blended feed in this example included about 14 wt % micro carbon residue, about 3 wt % sulfur, a nitrogen content of about 1600 wppm, and a density of about 1.11 g/cm³. The reaction conditions at start of run included a pressure of about 2400 psig (~16.5 MPag), an LHSV of about 0.25 hr$^{-1}$, a temperature of about 370° C., and a hydrogen treat gas rate of about 10,000 SCF/bbl (~1700 Nm³/m³).

At start of run, fractionation of the total product resulted in 3 wt % $H_2S$, 1 wt % 5 wt % naphtha ($C_5$-177° C.), 51 wt % diesel boiling range product (177° C.-371° C.) having a sulfur content of less than 10 wppm, and 40 wt % of 371° C.+ product. The sulfur content of the total liquid product was 75 wppm. It is noted that this lower sulfur content in the total liquid product was achieved at a lower pressure than the start of run conditions in Example 1 (16.5 MPag in Example 4 vs. 17.9 MPag in Example 1). Additionally, the yield of diesel boiling range products is increased relative to Example 1 (51 wt % vs 47 wt %) while the yield of 371° C.+ products is decreased (40 wt % vs 45 wt %). It was unexpected that addition of a difficult to process fraction to a catalytic slurry oil could actually improve the yield of the more desirable diesel boiling range products for the blended feed. The diesel boiling range products were suitable for use, for example, as a diesel fuel blendstock. The processing run was continued for 50 days without plugging. The stability of the reactor appeared to be better than the stability in Example 1 for processing of the catalytic slurry oil feed.

Example 5—Characterization of Hydrotreated Effluent

A blended feed was formed by combining about 80 wt % of a catalytic slurry oil with about 20 wt % of a steam cracker tar. The catalytic slurry oil had the properties shown in Table 1.

TABLE 1

| Catalytic Slurry Oil Properties | |
|---|---|
| Density @ 15.6° C. (g/cm$^3$) | 1.12 |
| Sulfur (wt %) | 3.9 |
| Nitrogen (wppm) | 1800 |
| Micro Carbon Residue (wt %) | 9.5 |
| n-heptane insolubles (wt %) | 3.3 |
| Hydrogen content (wt %) | 7.2 |
| Viscosity @ 80° C. (cSt) | 67 |
| Viscosity @ 105° C. (cSt) | 20 |
| SIMDIS distillation | |
| T10 (° F./° C.) | 672/356 |
| T50 | 791/422 |
| T90 | 964/518 |
| 1050° F.+ (566° C.+) fraction (wt %) | 6 |

The steam cracker tar feed included a steam cracker vacuum gas oil portion. The steam cracker tar feed had the properties shown in Table 2.

TABLE 2

| Steam Cracker Tar Properties | |
|---|---|
| Density @ 15.6° C. (g/cm$^3$) | 1.10 |
| Density @ 70° C. (g/cm$^3$) | 1.06 |
| Density @ 90° C. (g/cm$^3$) | 1.05 |
| API Gravity | −2.63 |
| Sulfur (wt %) | 2.7 |
| Nitrogen (wppm) | 860 |
| Micro Carbon Residue (wt %) | 17.9 |
| n-heptane insolubles (wt %) | 8.6 |
| Hydrogen content (wt %) | 7.1 |
| SIMDIS distillation | |
| T5 (° F. /° C.) | 385/196 |
| T50 | 64/340 |
| T90 | 1143/617 |

Both the catalytic slurry oil and the blended feed of catalytic slurry oil and steam cracker tar were hydroprocessed in the presence of a commercially available supported NiMo hydrotreating catalyst at liquid hourly space velocities between about 0.25 hr$^{-1}$ and 1.0 hr$^{-1}$, temperatures between about 360° C. and about 420° C., a pressure of about 2400 psig (16.5 MPag), and a hydrogen treat gas rate of about 10,000 scf/b (1700 Nm$^3$/m$^3$). For both the catalytic slurry oil feedstock and the blended feedstock, about 20 wt % to 60 wt % of the feedstock was converted to a 700° F.– (371° C.–) product suitable for blending into a diesel fuel pool. At higher severity operation a 371° C.– product could be obtained from both types of feedstock that had a sulfur content of about 20 wppm or less.

The 850° F.+ (454° C.+) fraction of the hydrotreated effluent (from either the catalytic slurry oil or the blended feed) could be further hydroprocessed to form resins and/or adhesives. After additional high severity hydrogenation, such as the conditions described in Example 7, the twice hydroprocessed product was composed primarily of 4-7 ring polycyclic hydrocarbons, with at least 50 wt % of the polycyclic hydrocarbons corresponding to polycyclic naphthenes. The twice hydroprocessed 454° C.+ fraction included aromatics, with substantially all of the aromatics corresponding to naphthenoaromatics. Less than about 1000 wppm of the naphthenoaromatics corresponded to naphthenoaromatics with 4 or more aromatic rings.

Example 6—Formation of Carbon Black from Hydrotreated Effluent

The 371° C.+ portion of a hydrotreated effluent from Example 5 can be fractionated into a plurality of narrow boiling range fractions. The overall system for performing hydrotreatment and subsequent fractionation can be similar to the configuration shown in FIG. 2. In the configuration shown in FIG. 2, a total of ten separate fractions can be formed, corresponding to nine narrow boiling range fractions and a bottoms fraction. One or more of the narrow boiling range fractions can have a T5-T95 boiling range of about 40° F. to about 70° F. (~20° C.-~40° C.). The narrow boiling range fractions can be composed of at least about 50 wt % of polycyclic hydrocarbons having 4 to 7 rings. The narrow boiling range fractions can also have a low content of asphaltenes, allowing the narrow boiling range fractions to be easily vaporized and mixed with air prior to combustion. These narrow boiling range fractions can allow for formation of carbon blacks with narrow size distribution based on the similar molecular sizes being condensed from the narrow boiling range fraction. Yields of carbon black can be surprisingly high relative to the hydrogen content of the hydrotreated effluent because the naphthenoaromatics that represent a substantial portion of the composition can selectively combust to form polynuclear aromatics and water.

In one aspect, the low viscosity fractions, medium viscosity fractions, and high viscosity fractions can be separately processed using the furnace black process to form carbon black. In another aspect, each separate fraction (optionally excluding the bottoms fraction) can be processed using the furnace black process to form carbon black. In yet another aspect, the low viscosity fractions and the high viscosity fractions can be combined to form a feed to the furnace black process that has a bimodal boiling range distribution. In still another aspect, the low viscosity fractions and the bottoms can be combined to form a feed to the furnace black process that has a bimodal boiling range distribution.

Example 7—Production of Resins

Fractions corresponding to the 900° F.+ (482° C.+) portion of a hydrotreated effluent produced according to Example 5 were exposed to further hydroprocessing to form resins. The further hydroprocessing was performed by exposing the 482° C.+ fractions to a stacked bed of a commercially available supported NiMo hydrotreating catalyst followed by a commercially available aromatic saturation catalyst corresponding to Pt on an amorphous support. The 482° C.+ fractions were exposed to the stacked bed of catalyst under a pressure of 3500 psig (24.1 MPag), a temperature of 330° C., and an LHSV of 0.2 hr$^{-1}$. The resulting twice-hydroprocessed fractions had aromatic contents between 0.1 wt % and 5 wt %. The product colors of the twice-hydroprocessed fractions ranged from water white (clear) to yellow. The twice-hydroprocessed fractions were suitable for use as resins.

As a further example, processing of narrow fractionation cut 9, corresponding to the highest boiling of the heavy viscosity narrow fractions, was exposed to the stacked catalyst bed at the processing conditions detailed above. The resulting twice-hydroprocessed fraction had a yellow appearance and was believed to be suitable for use as a resin. In some aspects, a twice-hydroprocessed fraction may have a T10 boiling point of at least 950° F. (510° C.), a T50 boiling point of at least 1050° F. (566° C.), and/or a T90 boiling point of 1150° F. (621° C.) or less.

ADDITIONAL EMBODIMENTS

Embodiment 1

A method for forming a hydrocarbon product, comprising: exposing a feed comprising at least about 60 wt % of a catalytic slurry oil based on a weight of the feed to a hydrotreating catalyst in a fixed bed under effective hydrotreating conditions to form a hydrotreated effluent, a liquid portion of the hydrotreated effluent having a sulfur content of about 200 wppm or less and an API gravity of at least 5; fractionating the liquid portion of the hydrotreated effluent to form a plurality of fractions having a T5 boiling point of at least 371° C.; and processing at least a portion of at least one fraction of the plurality of fractions under a) conditions for formation of at least 5 wt % carbon black (for example, conditions comprising a furnace black process) based on a weight of the at least one fraction b) second hydroprocessing conditions for forming at least one twice-hydroprocessed fraction comprising at least about 50 wt % polycyclic hydrocarbons and a content of aromatics different from naphthenoaromatics of about 1.0 wt % or less, based on a weight of the twice-hydroprocessed fraction; or c) conditions for formation of at least 5 wt % carbon fiber based on a weight of the at least one fraction.

Embodiment 2

The method of Embodiment 1, wherein the at least one fraction has a combined sulfur and nitrogen content of about 200 wppm or less, or about 100 wppm or less.

Embodiment 3

The method of any of the above embodiments, wherein the at least one fraction has a T5 boiling point of at least 454° C., a T10 boiling point of at least 510° C., a T90 boiling point of 621° C., or a combination thereof.

Embodiment 4

The method of any of the above embodiments, wherein processing the at least one fraction comprises processing two or more fractions, the two or more fractions being combined to form a combined fraction having at least one of a bimodal distillation profile and a multimodal distillation profile.

Embodiment 5

The method of Embodiment 4, wherein the combined fraction is processed under conditions for forming carbon black, the carbon black comprising particles having at least one of a bimodal particle size distribution and a multimodal particle size distribution.

Embodiment 6

The method of any of the above embodiments, wherein the at least one fraction comprises one or more fractions having a T5 to T95 boiling range of about 20° C. to about 40° C.

Embodiment 7

The method of any of the above embodiments, wherein the method further comprises separating the feed to form an effluent having a reduced particle content, the exposing the feed to a hydrotreating catalyst comprising exposing the effluent having a reduced particle content to the hydrotreating catalyst.

Embodiment 8

The method of any of the above embodiments, wherein processing the at least one fraction under second hydroprocessing conditions comprises exposing the at least one fraction to a hydrotreating catalyst, an aromatic saturation catalyst, or a combination thereof.

Embodiment 9

The method of any of the above embodiments, wherein the feed further comprises about 5 wt % to about 30 wt % of steam cracker tar (based on weight of the feed), the feed optionally further comprising about 1 wt % to about 30 wt % of flux (based on weight of the feed).

Embodiment 10

The method of any of the above embodiments, wherein the plurality of fractions comprise at least about 60 wt % polycyclic hydrocarbons based on a weight of the plurality of fractions, or at least about 70 wt %.

Embodiment 11

A hydrotreated effluent comprising an 850° F.+ (454° C.+) fraction, the 850° F.+ (454° C.+) fraction comprising at least about 50 wt % of polycyclic hydrocarbonaceous compounds, at least about 5 wt % aromatics, a content of aromatics different from naphthenoaromatics of about 1.0 wt % or less, and a content of naphthenoaromatics having 4 or more aromatic rings being about 1000 wppm or less, based on a weight of the 850° F.+ (454° C.+) fraction, wherein at least about 50 wt % of the polycyclic hydrocarbonaceous compounds comprise naphthenes based on a total weight of polycyclic hydrocarbonaceous compounds in the 850° F.+ (454° C.+) fraction.

Embodiment 12

The hydrotreated effluent of Embodiment 11, wherein the 850° F.+(454° C.+) fraction comprises at least about 60 wt % of polycyclic hydrocarbonaceous compounds (based on weight of the 454° C.+ fraction), or at least about 70 wt %; or wherein the 850° F.+(454° C.+) fraction comprises at least about 50 wt % of polycyclic hydrocarbons (based on weight of the 454° C.+ fraction), or at least about 60 wt %, or at least about 70 wt %.

Embodiment 13

A hydrotreated effluent fraction having a T10 boiling point of at least 510° C., optionally a T50 boiling point of at least 566° C., and a T90 boiling point of 621° C. or less, the fraction comprising at least about 50 wt % of polycyclic hydrocarbonaceous compounds (or at least about 60 wt %, or at least about 70 wt %), about 0.1 wt % to about 5.0 wt % aromatics, a content of aromatics different from naphthenoaromatics of about 1.0 wt % or less (or about 1000 wppm or less), and a content of naphthenoaromatics having 4 or more aromatic rings being about 1000 wppm or less, based on a weight of the hydrotreated effluent fraction, the hydrotreated effluent fraction optionally comprising about 10 wt % of paraffins or less (based on weight of the hydrotreated effluent fraction), or about 5.0 wt % or less, or about 2.0 wt % or less.

Embodiment 14

The hydrotreated effluent or hydrotreated effluent fraction of any of Embodiments 11-13, wherein the hydrotreated effluent or hydrotreated effluent fraction is formed by a process comprising hydrotreatment of a feed comprising at least 60 wt % of a catalytic slurry oil based on a weight of the feed, at least 10 wt % of a steam cracker tar based on a weight of the feed, or a combination thereof.

Embodiment 15

A carbon black product, a resin product, or a carbon fiber product made according to the method of any of Embodiments 1-10.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for forming a hydrocarbon product, comprising:

exposing a feed comprising at least about 60 wt % of a catalytic slurry oil based on a weight of the feed to a hydrotreating catalyst in a fixed bed under effective hydrotreating conditions to form a hydrotreated effluent, a liquid portion of the hydrotreated effluent having a sulfur content of about 200 wppm or less and an API gravity of at least 5;

fractionating the liquid portion of the hydrotreated effluent to form a plurality of fractions having a T5 boiling point of at least 371° C.;

processing at least a portion of at least one fraction of the plurality of fractions under conditions for formation of at least 5 wt % carbon black based on a weight of the at least one fraction.

2. The method of claim 1, wherein the at least one fraction has a combined sulfur and nitrogen content of about 200 wppm or less.

3. The method of claim 1, wherein the at least one fraction has a T5 boiling point of at least 454° C.

4. The method of claim 1, wherein the conditions for formation of carbon black comprise a furnace black process.

5. The method of claim 1, wherein processing at least a portion of the at least one fraction comprises processing at least a portion of two or more fractions, the two or more fractions being combined to form a combined fraction having at least one of a bimodal distillation profile and a multimodal distillation profile.

6. The method of claim 5, wherein the combined fraction is processed under conditions for forming carbon black, the carbon black comprising particles having at least one of a bimodal particle size distribution and a multimodal particle size distribution.

7. The method of claim 1, wherein the at least one fraction comprises one or more fractions having a T5 to T95 boiling range of about 20° C. to about 40° C.

8. The method of claim 1, wherein the method further comprises separating the feed to form an effluent having a reduced particle content, the exposing the feed to a hydrotreating catalyst comprising exposing the effluent having a reduced particle content to the hydrotreating catalyst.

9. The method of claim 1, wherein the feed further comprises about 5 wt % to about 30 wt % of steam cracker tar based on the weight of the feed.

10. The method of claim 1, wherein the plurality of fractions comprise at least about 60 wt % polycyclic hydrocarbons based on a weight of the plurality of fractions.

* * * * *